US012371308B2

(12) United States Patent
Chalavon

(10) Patent No.: US 12,371,308 B2
(45) Date of Patent: Jul. 29, 2025

(54) DOUBLE-REEVED LIFTING DEVICE WITH AN IMPROVED PAWL-LOCKING MECHANISM

(71) Applicant: MANITOWOC CRANE GROUP FRANCE, Dardilly (FR)

(72) Inventor: Jonathan Chalavon, Mions (FR)

(73) Assignee: Manitowoc Crane Group France, Dardilly (FR)

( * ) Notice: Subject to any disclaimer, the term of this patent is extended or adjusted under 35 U.S.C. 154(b) by 282 days.

(21) Appl. No.: 18/310,211

(22) Filed: May 1, 2023

(65) Prior Publication Data

US 2023/0356988 A1 Nov. 9, 2023

(30) Foreign Application Priority Data

May 4, 2022 (FR) ........................................ 2204233

(51) Int. Cl.

*B66D 3/00* (2006.01)
*B66C 13/46* (2006.01)
*B66D 3/08* (2006.01)

(52) U.S. Cl.

CPC ................ *B66D 3/08* (2013.01); *B66C 13/46* (2013.01)

(58) Field of Classification Search

CPC ...... B66D 3/08043; B66C 13/46; B66C 11/16
See application file for complete search history.

(56) References Cited

U.S. PATENT DOCUMENTS

| | | | | | |
|---|---|---|---|---|---|
| 1,436,608 | A * | 11/1922 | Rodier | B66D 3/043 254/401 |
| 3,009,728 | A * | 11/1961 | Breslav | B66C 1/34 294/82.15 |
| 3,306,469 | A | 2/1967 | Durand | |
| 4,721,286 | A * | 1/1988 | Hey | B66C 1/34 254/401 |

(Continued)

FOREIGN PATENT DOCUMENTS

| | | | | |
|---|---|---|---|---|
| CN | 208761990 U * | 4/2019 | B66C 1/36 |
| DE | 2845874 C2 * | 3/1982 | B66D 3/04 |

(Continued)

OTHER PUBLICATIONS

Search Report and Written Opinion issued in connection with FR Pat. Appl. 22/04233, dated Dec. 12, 2022, with EN translation.

*Primary Examiner* — Emmanuel M Marcelo
(74) *Attorney, Agent, or Firm* — Cook Alex Ltd.

(57) ABSTRACT

A double-reeved lifting device includes a lower reeve block secured to a lifting hook and an upper reeve block, wherein the two reeve blocks are part of a mechanical reversible connection system to be reversibly configurable between a connected configuration and a disconnected configuration, with a locking mechanism and a complementary locking structure supporting a locking member. The locking mechanism includes a chassis having a locking channel provided with a mouthpiece through which the locking member can enter and exit and can slide in the locking channel respectively during a relative approach and distancing between the two reeve blocks. A pawl is pivotally mounted on the chassis to pivot inside the locking channel and is provided with a free end capable of being engaged with the locking member. A thrust stop assembly and elastic return member push on the pawl.

21 Claims, 12 Drawing Sheets

(56) References Cited

U.S. PATENT DOCUMENTS

| | | | | |
|---|---|---|---|---|
| 7,946,560 | B2 * | 5/2011 | Drent | B66D 3/06 294/82.11 |
| 2005/0127695 | A1 * | 6/2005 | Cranston | B66C 1/34 294/82.3 |
| 2022/0081266 | A1 * | 3/2022 | Chalavon | B66D 3/06 |
| 2022/0081267 | A1 * | 3/2022 | Chalavon | B66D 3/043 |

FOREIGN PATENT DOCUMENTS

| | | | | |
|---|---|---|---|---|
| DE | 3149690 | A1 | 6/1983 | |
| DE | 3543214 | A1 | 12/1986 | |
| FR | 1520612 | A | 4/1968 | |
| FR | 2131924 | A1 | 11/1972 | |
| FR | 2137333 | A1 | 12/1972 | |
| FR | 2228024 | A1 | 11/1974 | |
| FR | 2333743 | A1 | 7/1977 | |
| FR | 2368431 | A1 | 5/1978 | |
| FR | 3114090 | A1 * | 3/2022 | B66C 13/00 |
| GB | 2176456 | A | 12/1986 | |
| IT | MI20101302 | A1 | 1/2012 | |

* cited by examiner

DOUBLE-REEVED LIFTING DEVICE WITH AN IMPROVED PAWL-LOCKING MECHANISM

FIELD

The invention relates to a double-reeved lifting device for a lifting machinery, as well as a lifting machinery and a lifting method associated thereto.

The invention may find a non-limiting application for a lifting machinery such as a crane, and in particular a tower crane.

BACKGROUND

In a known manner, a double-reeved lifting device is adapted to be reversibly configured between two reeving configurations including a simple-reeved configuration with two lifting strands and a double-reeved configuration with four lifting strands, wherein the double-reeved lifting device comprises a reeving change system allowing to perform a change of reeving between the simple-reeved configuration and the double-reeved configuration.

Conventionally, such a double-reeved lifting device comprises two reeve blocks, namely a lower reeve block secured to a lifting hook and an upper reeve block, and these two reeve blocks comprise reversible connection means adapted to be reversibly configured between:

- a connected configuration wherein the upper reeve block is connected to the lower reeve block so as to be able to accompany it in ascending/descending movements, and
- a disconnected configuration wherein the upper reeve block is disconnected from the lower reeve block so as to be able to remain hanging above the lower reeve block which could perform descending/ascending movements without the upper reeve block.

The lower reeve block is hanging from the lifting machinery by a lifting rope connected to a lifting winch to make the lower reeve block ascend/descend, and this lifting rope passes through the upper reeve block, so that the connected configuration and the disconnected configuration respectively correspond to a double-reeved configuration and to a simple-reeved configuration, or vice versa, of the double-reeved lifting device, depending on the passage of the lifting rope at the level of the upper reeve block.

For example, the documents FR 1 520 612, FR 2 137 333, FR 2 368 431, FR 2 131 924, FR 2 228 024 describe double-reeved lifting devices wherein the connected configuration corresponds to the double-reeved configuration, and the disconnected configuration corresponds to the simple-reeved configuration; the lifting rope passing under a pulley carried by the upper reeve block.

And conversely, the documents GB 2 176 456, FR 2 333 743, DE 31 49 690, DE 35 43 214 describe double-reeved lifting devices wherein the connected configuration corresponds to the simple-reeved configuration, and the disconnected configuration corresponds to the double-reeved configuration; the lifting rope passing above a pulley carried by the upper reeve block.

However, the reversible connection means known in this prior art to connect/disconnect the two reeve blocks, are barely satisfactory. Indeed, some of them involve numerous parts which become loose, reduce the reliability of the mechanism and require a lot of maintenance, not to mention the high manufacturing costs, others require accessories to activate actuators located in general at the root of the jib, which limits the possibilities of replacement of the reeving at the root of the jib, posing an accessibility problem if the latter is in an inaccessible area of the work site, other still require manual operations on the ground for connecting/disconnecting the reeve blocks which might turn out to be dangerous if they are badly performed, and which are time-consuming.

SUMMARY

The present invention aims at solving at least part of the aforementioned drawbacks, by providing a double-reeved lifting device equipped with robust reversible connection means as they are composed by few parts.

The invention also aims at providing reversible connection means equipped with a locking mechanism which makes the two connected and disconnected configurations more reliable, in order to avoid any risk of unwanted disconnection and therefore of the lower reeve block falling.

To this end, the one or more embodiment of the present invention proposes a double-reeved lifting device for a lifting machinery, such as for example a crane, comprising two reeve blocks, namely a lower reeve block secured to a lifting hook and an upper reeve block, wherein the two reeve blocks comprise a mechanical reversible connection system to be reversibly configured between:

- a connected configuration wherein the upper reeve block is connected to the lower reeve block so as to be able to accompany it in ascending/descending movements according to a main axis, and
- a disconnected configuration wherein the upper reeve block is disconnected from the lower reeve block so as to be able to remain hanging above the lower reeve block which could perform descending/ascending movements without the upper reeve block,
- wherein the reversible connection system comprises a locking mechanism mounted on one of the two reeve blocks, and a complementary locking structure mounted on the other of the two reeve blocks and comprising a locking member capable of cooperating with the locking mechanism;

and wherein the locking mechanism comprises:

- a chassis having a locking channel of elongated shape along the main axis and provided with a mouthpiece through which the locking member can enter and exit the locking channel and can slide in the locking channel in an entry direction and in an exit direction, opposite to the entry direction, respectively upon a relative approach or a relative distancing between the two reeve blocks, and
- at least one pawl pivotally mounted on the chassis around a pivot axis so as to pivot inside the locking channel, said pawl being provided with a free end adapted to engage with the locking member this locking mechanism further comprising:

- a thrust stop provided with a free front end adapted to abut against the pawl, said thrust stop being movably mounted on the chassis between a maximum advanced position in the absence of a thrust exerted by the pawl on said free front end, and retracted positions in the presence of a thrust force exerted by the pawl on said free front end; and
- an elastic return member urging said thrust stop towards its maximum advanced position and providing a force resisting to the thrust force exerted by the pawl on said free front end.

Thus, the one or more embodiment of the present invention proposes a reversible connection system which is configured to convert ascending/descending movements of the lower reeve block (vertical translation movements) into sliding movements of the locking member in the locking channel so that it engages with the free end of the pawl (connected configuration) or disengages from this free end (disconnected configuration), which will allow the two reeve blocks to be connected/disconnected easily, in a secure and reliable manner.

Moreover, the thrust stop and the elastic return member form an elastic thrust device which is particularly advantageous, because it makes it possible to push on the pawl (instead of pulling on it) so that it engages in a reliable and stable manner with the locking member in the free end of the pawl, to avoid an unstable grip likely to induce a disconnection between the two reeve blocks.

In fact, such a thrust exerted by this elastic thrust device contributes to ensuring that the free front end of the thrust stop keeps contact with the pawl during connection (described in more detail later), thus making the meshing or the engaging of the locking member in the free end of the pawl. It is clear that the free front end of the thrust stop is not attached to the pawl, so that the pawl can lift off (or leave contact) from this free front end.

Within the meaning of the invention, the connected configuration and the disconnected configuration correspond respectively to a double-reeved configuration and a simple-reeved configuration, or vice versa, of the double-reeved lifting device.

According to one feature, the thrust stop is slidably mounted in translation on the chassis, to exert a linear thrust on the pawl which pivots under the effect of such a thrust.

In a particular embodiment, the double-reeved lifting device comprises viewing means configured to view whether the thrust stop is in its maximum advanced position which is associated with the disconnected configuration or in one of its retracted positions, called connection retracted position, which is associated with the connected configuration.

In other words, provision is made, in such an embodiment, to be able to view (in particular for the pilot of the lifting machinery) the position of the thrust stop, which is intrinsically linked to the configuration of the two reeve blocks, which will make it possible to confirm that the two reeve blocks are indeed in one of the two connected or disconnected configurations, and are not in an unstable configuration with an unstable sticking of the locking member in the locking channel; such an unstable sticking (or such an unstable configuration) corresponding to a situation wherein the locking member is not in stable engagement with the free end of the pawl (the stable engagement corresponding to the connected configuration), but becomes stuck between a rim of the pawl and a section of the locking channel.

Moreover, by viewing the positions of the thrust stop, it is possible to follow the connection phase (passage from the disconnected configuration to the connected configuration) and the disconnection phase (passage from the connected configuration to the disconnected configuration), and therefore to ensure that the phases take place in accordance with the predefined successive steps.

Advantageously, the viewing means is configured to view whether the thrust stop is in another of the retracted positions, called unstable retracted position, which is associated with an unstable configuration wherein the thrust stop has moved back beyond the connection retracted position.

Thus, the viewing means makes it possible to view whether the reeve blocks are in the unstable configuration, thus making it possible to stop or resume the connection or disconnection phase, and thus to avoid an error which could have dramatic consequences, such as an unexpected disconnection of the lower reeve block possibly leading to a fall of the lower reeve block and of any hanging load therefrom.

In one embodiment, the viewing means comprises a window made in the chassis to view a mark provided on the thrust stop when in the maximum advanced position or in the connection retracted position.

In other words, the window makes it possible to see from the outside in which position the thrust stop is located, thus making it possible to visually and directly appreciate in which configuration the two reeve blocks are located. Such a solution is particularly interesting because it is economical, and is particularly suitable for a tower crane where the pilot, located in the pilot cabin at the top of the mast and at the foot of the jib, is quite close to the two reeve blocks when they are lowered at the foot of the jib to perform a connection or disconnection phase.

In one embodiment, the viewing means comprises, on the chassis, at least one visual reference which is in visual correspondence with the mark of the thrust stop when the thrust stop is in its maximum advanced position or in its connection retracted position.

According to a possibility, the at least one visual reference comprises a visual connection reference which is in visual correspondence with the mark of the thrust stop when the thrust stop is in its maximum advanced position, and a visual disconnection reference which is in visual correspondence with the mark of the thrust stop when the thrust stop is in its connection retracted position.

According to another possibility, the at least one visual reference comprises a visual error reference which is in visual correspondence with the mark of the thrust stop when the thrust stop is in its unstable retracted position.

In one embodiment, the thrust stop has a free rear end, opposite the free front end, and the mark is provided on said free rear end which faces the window.

According to one feature, the thrust stop passes through a fixed support secured to the chassis so that the free front end and the free rear end are disposed on either side of the fixed support.

According to another feature, the elastic return member is inserted between the fixed support and the free front end.

In a further embodiment, the viewing means comprises at least one position sensor configured to detect the thrust stop at least in its maximum advanced position and in its connection retracted position, and a displayer connected to the at least one position sensor to display the position of the thrust stop according to a detection by the at least one position sensor.

This solution with this position sensor is suitable if the operator who controls the connection or disconnection phase is far from the two reeve blocks, and in this case he will be able to view the correct progress of the phase on the displayer (such as for example a screen or a light panel).

The at least one position sensor can be a contact sensor (which therefore comes into contact with the thrust stop depending on its position in particular), or a contactless sensor such as for example an inductive sensor, a resistive sensor or a light sensor (such as a camera or an infrared sensor).

In one embodiment, the pawl is pivotally movable between:

a neutral position wherein the thrust stop is in its maximum advanced position with its free front end in contact with the pawl at rest;

a distal position, wherein the pawl clears the passage for the locking member by the effect of a push exerted by said locking member sliding in the entry direction, said distal position being associated to a pivoting of the pawl in a distal rotational direction from the neutral position, said pawl thus exerting a thrust force on the free front end of the thrust stop which is pushed to one of its retracted positions, called the maximum retracted position;

a proximal position, wherein the pawl clears the passage for the locking member by the effect of a thrust exerted by said locking member sliding in the exit direction, said proximal position being associated with a pivoting of the pawl in a proximal rotational direction, opposite to the distal rotational direction, from the neutral position, the pawl no longer being in contact with the free front end of the thrust stop which is then in its maximum advanced position; and a locking position, intermediate between the neutral position and the distal position, wherein the free end of the pawl blocks the locking member by sliding in the locking channel according to the exit direction, with the locking member stuck inside said free end, said pawl thus exerting a thrust force on the free front end of the thrust stop which is blocked in one of its retracted positions, called connection retracted position, located between the maximum retracted position and maximum advanced position.

Advantageously, the at least one pawl comprises a single pawl.

In an embodiment, the double-reeved lifting device comprises a removable stop which is movable on the chassis into a blocking position wherein said removable stop blocks the pawl in pivoting when the pawl is engaged with the locking member in the connected configuration.

Such a removable stop thus makes it possible, when it is positioned in its blocking position, to manually secure the locking of the connected configuration, for example during specific uses such as during transport on the road, or during blind use, such as for the assembly of an elevator cabin on the mast of the crane.

The removable stop can also be moved on the chassis into a storage position wherein said removable stop is moved away from the pawl so as not to interact with the pawl.

Thus, the removable stop, when not used in the blocking position, remains accessible because it is mounted on the chassis, without interfering with the pawl, and can be easily reached to be positioned when necessary in the blocking position.

In an embodiment, the double-reeved lifting device comprises a lower stop disposed in a bottom of the locking channel, opposite the mouthpiece, and against which the locking member can bear, said lower stop being mounted so as to move on the chassis between a raised position in the absence of thrust exerted by the locking member on said lower stop, and lowered positions in the presence of a thrust force exerted by the locking member on said lower stop; and a lower elastic return member urging said lower stop towards its raised position and providing a force resisting a thrust force exerted by the locking member on said lower stop.

Such a lower stop/elastic return member assembly may be beneficial for reducing the influence of the dynamics of the lifting rope slack, and making the relative movements between the lower reeve block and the upper reeve block reliable, in particular when the locking member is at the bottom of the locking channel.

According to a possibility, the lower stop is slidably mounted in translation on the chassis along the main axis.

According to another possibility, the double-reeved lifting device comprises a lower viewing means configured to view whether the lower stop is in its raised position which is associated with the connected configuration or in one of its lowered positions called unstable lowered position, which is associated with an unstable configuration wherein the locking member is stuck under the pawl.

Such a lower viewing means thus makes it possible to detect a risk of bad connection between the pawl and the locking member, where the locking member would be stuck under the pawl, in particular stuck by a tip of a distal rim of the pawl.

One or more embodiment of the present invention also relates to a lifting machinery, such as for example a crane, comprising a jib and a double-reeved lifting device configured to lift/lower a load along the jib, this double-reeved lifting device being according to the invention, wherein the lower reeve block is hanging on the jib by a lifting rope connected to a lifting winch to ascend/descend the lower reeve block, this lifting rope passing through the upper reeve block.

BRIEF DESCRIPTION OF THE DRAWINGS

Other features and advantages of the present invention will appear on reading the detailed description below, of a non-limiting example of implementation, made with reference to the appended figures wherein.

DESCRIPTION

Figure 1:
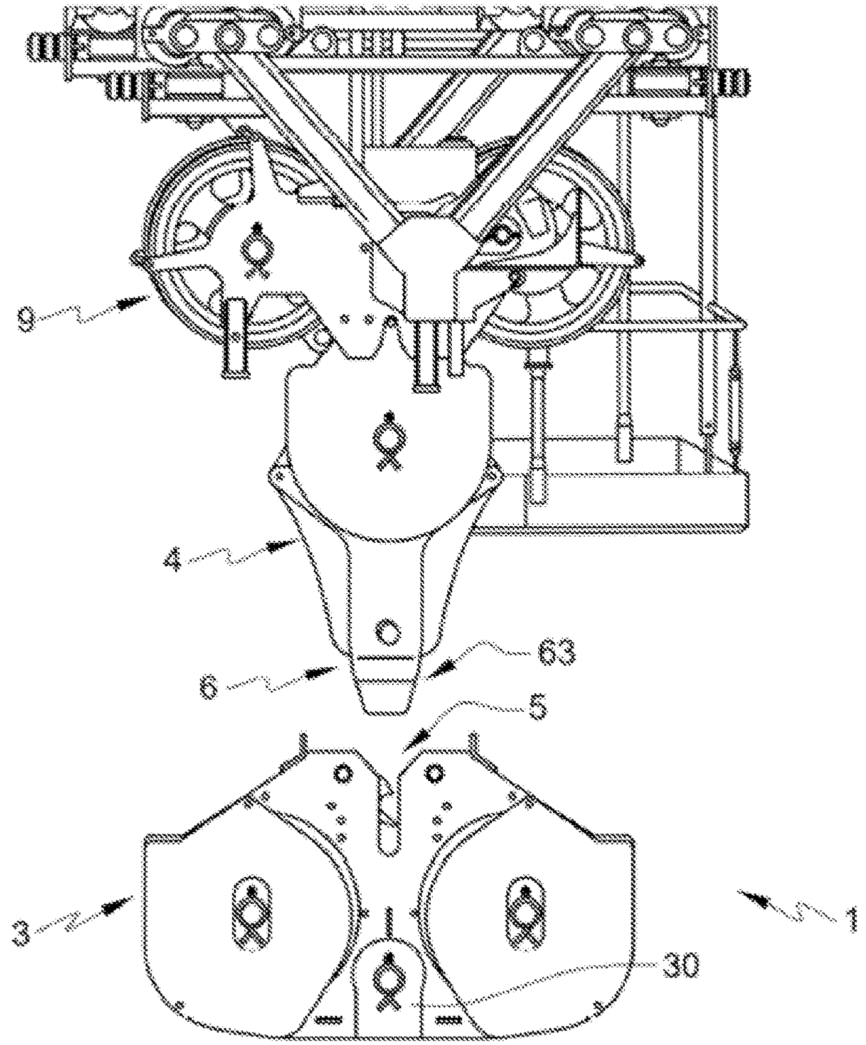
FIG. 1 is a schematic perspective view of a double-reeved lifting device according to the invention, in a hanging situation on a distribution trolley, in a disconnected configuration.
Figure 3:
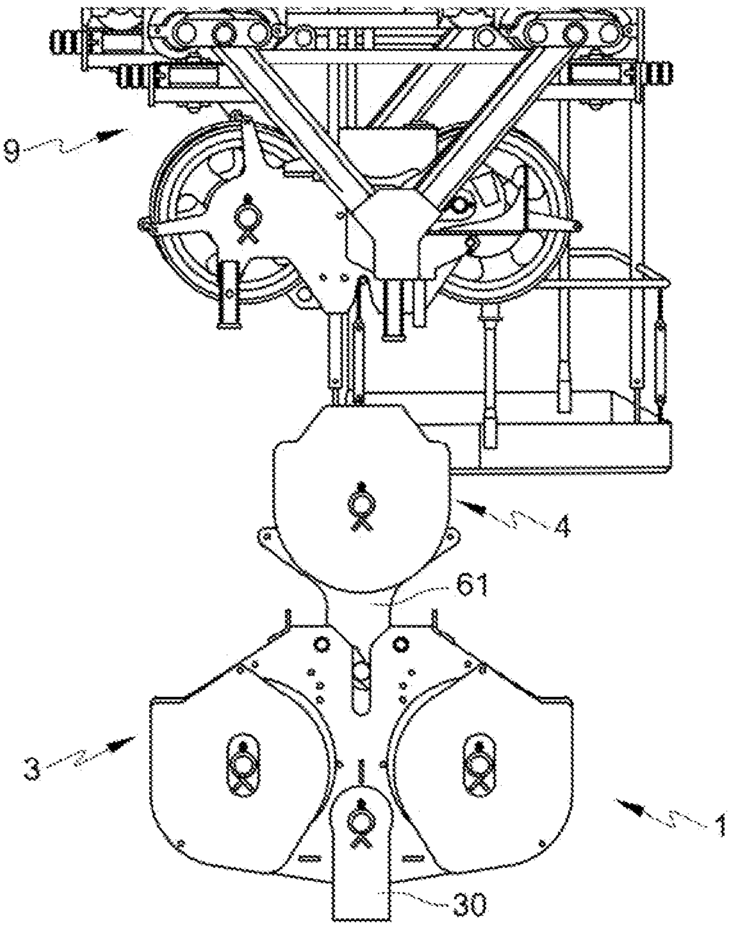
FIG. 3 is a schematic perspective view of the double-reeved lifting device of FIG. 1, in a hanging position on the distribution trolley, in a connected configuration.

Referring to FIG. 1 and FIG. 3, a double-reeved lifting device 1 according to the invention is provided for a lifting machinery, such as for example a crane, which has a jib (not illustrated) and a distribution trolley 9 movably mounted on the jib and linked to a distribution system adapted to displace the distribution trolley 9 along the jib according to opposite forward direction and backward direction; this distribution system consisting for example of a distribution winch which cooperates with a distribution rope for the displacement of the distribution trolley 9.

This double-reeved lifting device 1 comprises two reeve blocks 3, 4, namely:

- a lower reeve block 3 secured to a lifting hook 30 (partially illustrated) intended to hook a load, where the lower reeve block 3 hangs from the distribution trolley 9 (and therefore hangs from the jib) by a lifting rope 90 (shown in FIG. 19) connected to a lifting winch so as to ascend/descend the lower reeve block 3; and
- an upper reeve block 4 through which the lifting rope 90 passes, the upper reeve block 4 also hanging from the distribution trolley 9.

Also, the lower reeve block 3 supports lower rope deflecting means, such as for example two pulleys 31, for the passage of the lifting rope 90, and the upper reeve block 4 supports upper rope deflecting means, such as for example a pulley 41, for the passage of the lifting rope 90.

Thus, the double-reeved lifting device 1 is formed to lift/lower a load along the jib of the lifting machinery.

The two reeve blocks 3, 4 are equipped with a reversible mechanical connection system adapted to be reversibly configured between:

- a connected configuration (illustrated in FIGS. 3 and 19) wherein the upper reeve block 4 is connected to the lower reeve block 3 so as to be able to accompany it in ascending/descending movements along a main axis which is of vertical extension, and
- a disconnected configuration (illustrated in FIG. 1) wherein the upper reeve block 4 is disconnected from the lower reeve block 3 so as to be able to remain hanging above the lower reeve block 3 which could perform descending/ascending movements alone without the upper reeve block 4.

Depending on the passage of the lifting rope in the lower rope deflecting means 31 provided on the lower reeve block 3 and in the upper rope deflecting means 41 provided on the upper reeve block 4, the connected configuration and the disconnected configuration respectively correspond to a double-reeved configuration and a simple-reeved configuration, or vice versa, of the double-reeved lifting device 1; the simple-reeved configuration being associated to a suspension of the hook 30 (and therefore of the load) by two lifting strands of the lifting rope, and the double-reeved configuration being associated to a suspension of the hook 30 (and therefore of the load) by four lifting strands of the lifting rope.

Figure 19:
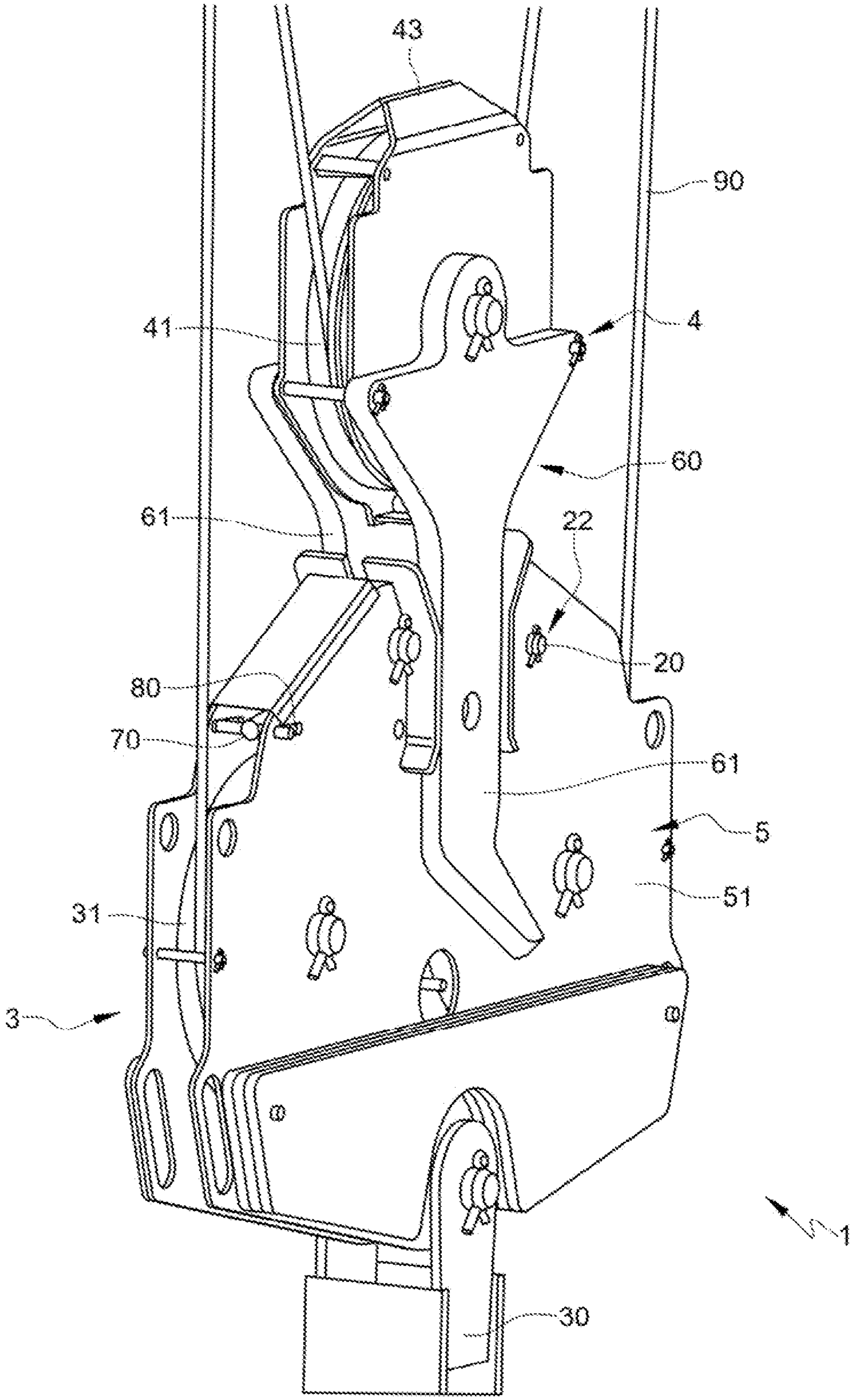
FIG. 19 is a schematic perspective view of a double-reeved lifting device according to an alternative embodiment of the invention, in a connected configuration.

In the illustrated example, and as seen in FIG. 19, the connected configuration corresponds to the double-reeved configuration (with four strands), so that the disconnected configuration corresponds to the simple-reeved configuration (with two strands).

The mechanical reversible connection system comprises a locking mechanism 5 mounted on the lower reeve block 3, and a complementary locking structure 6 mounted on the upper reeve block 4 and adapted to cooperate with the locking mechanism 5.

Referring to FIG. 3, the complementary locking structure 6 is part of the upper reeve block 4 and it is provided below the upper rope deflecting means, therefore below the pulley 41 in the illustrated example. This complementary locking structure 6 comprises:

- a frame 60 comprising two flanges 61 opposite one another and which delimit therebetween an open groove on the underside of the upper reeve block 4 so as to define an inlet 63; and
- a locking member 62 securely supported by the frame, where this locking member 62 forms a shaft extending along a longitudinal axis orthogonal to the main axis, and where this locking member 62 extends between the two flanges 61 at a determined distance from the inlet 63 of the groove.

As seen in FIG. 19, the upper reeve block 4 supports at the upper portion, opposite to the inlet 63 of the complementary locking structure 6, an upper stop 43 formed for example of two sides which meet in the shape of a wedge. This upper stop 43 prevents unlocking against an obstacle during an upward lifting movement.

Moreover, the flanges 61 are brought away from each other at the level of the inlet 63, so that this inlet 63 is flared.

Figure 2:
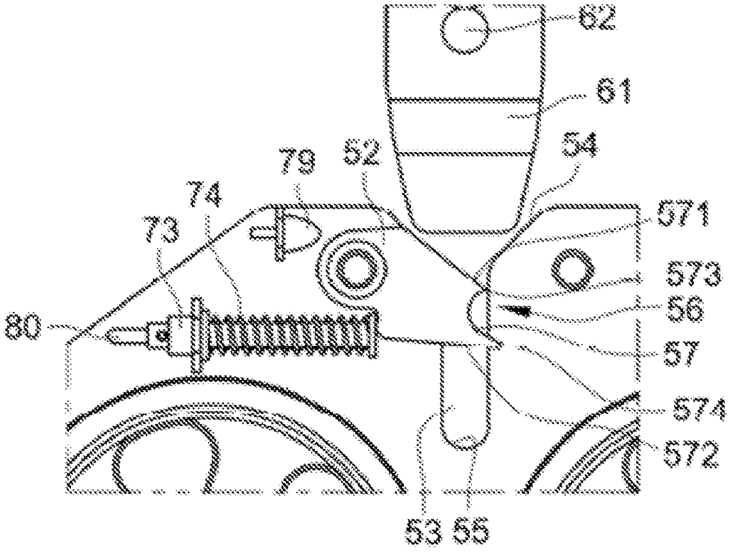
FIG. 2 is a partial schematic front view of the upper reeve block and the lower reeve block in the disconnected configuration for the double-reeved lifting device of FIG. 1, with the locking member disengaged from the lower reeve block and the pawl.
Figure 4:
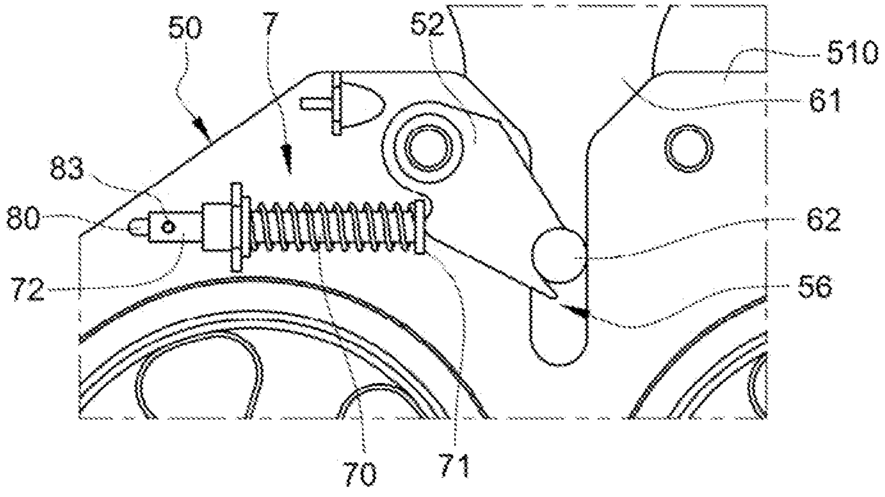
FIG. 4 is a partial schematic front view of the upper reeve block and the lower reeve block in the connected configuration for the double-reeved lifting device of FIGS. 1 and 3, with the locking member engaged in the lower reeve block and engaged with the pawl.

Referring to FIG. 2 and FIG. 4, the locking mechanism 5 is integrated to the lower reeve block 3 and it is provided above the lower rope deflecting means, therefore above the two pulleys 31 in the illustrated example.

This locking mechanism 5 comprises:

- a chassis 50 comprising two plates 51 opposite one another and which delimit an interspace therebetween; and
- a pawl 52 pivotally mounted on the chassis 50, between the two plates 51, wherein the pawl 52 is associated with a thrust device 7 described later.

The chassis 50 has a locking channel 53 having an elongated shape along the main axis (therefore along a vertical direction), where this locking channel 53 is formed by two notches formed opposite one another in the two plates 51 and opening onto upper rims 510 of the plates 51, so that this locking channel 53 is provided with a mouthpiece 54 through which the locking member 62 of the complementary locking structure 6 can enter and exit the locking channel 53. The mouthpiece 54 is flared to facilitate and center the insertion of the locking member 62 inside the locking channel 53.

The locking member 62 has a cross-section dimensioned so as to be able to slide inside the locking channel 53. The inner distance between the two flanges 61 of the frame 60 is larger than the thickness of the chassis 50, so that the chassis 50 could come into the groove of the frame 60 (therefore between the two flanges 61) via the inlet 63, which is advantageously flared to facilitate this passage.

Thus, the locking member 62 can slide in the locking channel 53 in an entry direction (downwards) and in an exit direction (upwards), opposite to the entry direction, respectively during a relative approach and a relative distancing between the two reeve blocks 3, 4. It is advantageous that the locking member 62 tightly slides (with a reduced clearance) inside the locking channel 53. Advantageously, this locking member 62 has a cylindrical section according to a determined diameter. Thus, the locking channel 53 has a width substantially equivalent to the diameter of the locking member 62.

The locking channel 53 has a bottom 55, which is located between the two pulleys 31, where this bottom 55 is adapted to stop a sliding of the locking member 62 in the entry direction. It should be noted that the two pulleys 31 are also rotatably mounted between the two plates 51.

The pawl 52 is unique, it is disposed on one side of the locking channel 53, and it is pivotally mounted on the chassis 50, between the two plates 51, around a pivot axis orthogonal to the main axis and also parallel to the longitudinal axis of the locking member 62. The pawl 52 thus pivots in a plane including the main axis, and which is orthogonal to the pivot axis.

The pawl 52 is provided with a free end 56 having a concave shape adapted to be engaged with the locking member 62, where the free end 56 has an indentation 57 with a shape complementary to the locking member 62. Thus, the indentation 57 of the free end 56 of the pawl 52 has a circle-arc shaped load-bearing area equivalent to the diameter of the locking member 62. The pawl 52 is disposed between the mouthpiece 54 and the bottom 55 of the locking channel 53.

The indentation 57 of the free end 56 is delimited by two opposite rims 571, 572 on which the locking member 62 can exert a thrust, namely a proximal rim 571, facing the mouthpiece 54 of the locking channel 53, and a distal rim 572 facing the bottom 55 of the locking channel 53. Moreover, the proximal rim 571 and the distal rim 572 respectively have a proximal length and a distal length measured radially from the pivot axis, and the proximal length is less than the distal length.

Moreover, the proximal rim 571 terminates in a proximal tip 573 forming a free end, and the distal rim 572 terminates in a distal tip 574 forming a free end; these two tips 573, 574 forming the ends of the indentation 57.

The thrust device 7 extends between the two plates 51 and it comprises a thrust stop 70 provided with a free front end 71 adapted to bear against the pawl 52, and more specifically against a bearing surface provided close to the pivot axis. This thrust stop 70 also has a free rear end 72, opposite the free front end 71. The thrust stop 70 is in the form of an elongated piece along an extension axis orthogonal to the main axis.

The thrust stop 70 is mounted movable in translation on the chassis 50, in a translation direction orthogonal to the main axis. The thrust stop 70 is sliding between:

- a maximum advanced position (visible in FIGS. 2, 5, 14 to 17) in the absence of a thrust exerted by the pawl 52 on its free front end 71, and
- some retracted positions (visible in FIGS. 4 and 6 to 13) in the presence of a thrust force exerted by the pawl 52 on its free front end 71.

The thrust stop 70 passes through and slides in a fixed support 73 secured to the chassis 50, so that the free front end 71 and the free rear end 72 are disposed on either side of the fixed support 73.

The thrust device 7 further comprises an elastic return member 74, for example in the form of a helical spring, this elastic return member 74 urging the thrust stop 70 towards its maximum advanced position and providing a resistive force to a thrust force exerted by the pawl 52 on its free front end 71. Thus, the elastic return member 74 is at rest in the maximum advanced position of the thrust stop 70.

In the illustrated example, this elastic return member 74 is interposed between the fixed support 73 and the free front end 71, and more precisely a stop surface provided on the free front end 71. Thus, when the pawl 52 exerts a thrust force on the free front end 71, causing the thrust stop 70 to move back, then the elastic return member 74 compresses and thus opposes this retraction.

The pawl 52 is pivotally movable between several positions defined below.

- a neutral position (visible in FIGS. 2, 5, 14, 15 and 17), wherein its free end 56 is located in the locking channel 53, and the thrust stop 70 is in its maximum advanced position with its free front end 71 in contact with pawl 52.
- a distal position (visible in FIG. 7) wherein the pawl 52 clears the passage for the locking member 62 under the effect of a thrust exerted by the locking member 62 sliding from the mouthpiece 54 according to the entry direction (downwards) towards the bottom 55, this distal position being associated with a bearing of the locking member 62 on the proximal rim 571, which causes a pivoting of the pawl 52 in a distal rotational direction from the neutral position (pivoting of the pawl 52 downwards), until the locking member 62 bears against the proximal tip 573, the pawl 52 thus exerting a thrust force on the free front end 71 of the thrust stop 70 which is pushed to one of its retracted positions, called maximum retracted position, when the bearing is made on the proximal tip 573 of the pawl 52. Indeed, the thrust stop 70 is at its maximum retraction when the locking member 62 is bearing on the proximal tip 573.
- a proximal position (visible in FIG. 16), wherein the pawl 52 clears the passage for the locking member 62 under the effect of a thrust exerted by the locking member 62 sliding in the exit direction (upwards), this proximal position being associated with a pivoting of the pawl 52 in a proximal rotational direction, opposite to the distal rotational direction, from the neutral position (pivoting of the pawl 52 upwards), the pawl 52 no longer being in contact with the free front end 71 of the thrust stop 70 which is then in its maximum advanced position.
- a locking position (visible in FIGS. 4, 10 and 11), intermediate between the neutral position and the distal position, wherein the free end 56 of the pawl 52 slidably blocks the locking member 62 in the locking channel 53 according to the exit direction, with the locking member 62 stuck inside this free end 56, said pawl 52 thus exerting a thrust force on the free front end 71 of the thrust stop 70 which is blocked in one of its retracted positions, called connection retracted position, located between the maximum retracted position and the maximum advanced position.
- an intermediate distal position (visible in FIG. 12), which follows the locking position in the disconnection phase, and wherein the pawl 52 clears the passage for the locking member 62 under the effect of a thrust exerted by the locking member 62 sliding from the indentation 57 in the entry direction (downwards) towards the bottom 55, this intermediate distal position being associated with a support of the locking member 62 on the distal rim 572 which causes the pawl 52 to pivot in the distal rotational direction from the locking position (pivoting of the pawl 52 downwards), said pawl 52 then exerting a thrust force on the free front end 71 of the thrust 70 until the locking member 62 bears against the distal tip 574, so that the thrust stop 70 is brought into one of its retracted positions, called the intermediate retracted position, located between the maximum retracted position and the connection retracted position.
- a first unstable position (visible in FIG. 8), which may follow the distal position of FIG. 7 during a connection phase, wherein the locking member 62 remains stuck in the locking channel 53 bearing on the proximal tip 573. The thrust stop 70 is then blocked in one of its retracted positions, called the first unstable retracted position, located between the maximum retracted position and the connection retracted position. The thrust device 9 is advantageous in that it minimizes, or even eliminates, the risk of such sticking in this first unstable position.
- a second unstable position, which is intermediate between the intermediate distal position of FIG. 12 and the position of FIG. 13 in a disconnection phase, wherein the locking member 62 remains stuck in the locking channel 53 bearing on the distal tip 574; in other words, the locking member 62 is stuck under the pawl 52. The thrust stop 70 is then locked in one of its retracted positions, called the second unstable retracted position, located between the first unstable retracted position and the connection retracted position. The thrust device 9 is again advantageous in that it minimizes, or even eliminates, the risk of such sticking in this second unstable position.

The double-reeved lifting device 1 can also comprise a proximal stop 79, made of an elastomeric material (for example rubber, silicone or other elastic material), and fixedly mounted on the chassis 50, between the two plates 51, at the level of the upper rims 510 of the plates 51 and above the pawl 52. This proximal stop 79 promotes the elastic return to the neutral position of the pawl 52 when the latter is brought into the proximal position.

Figure 18:
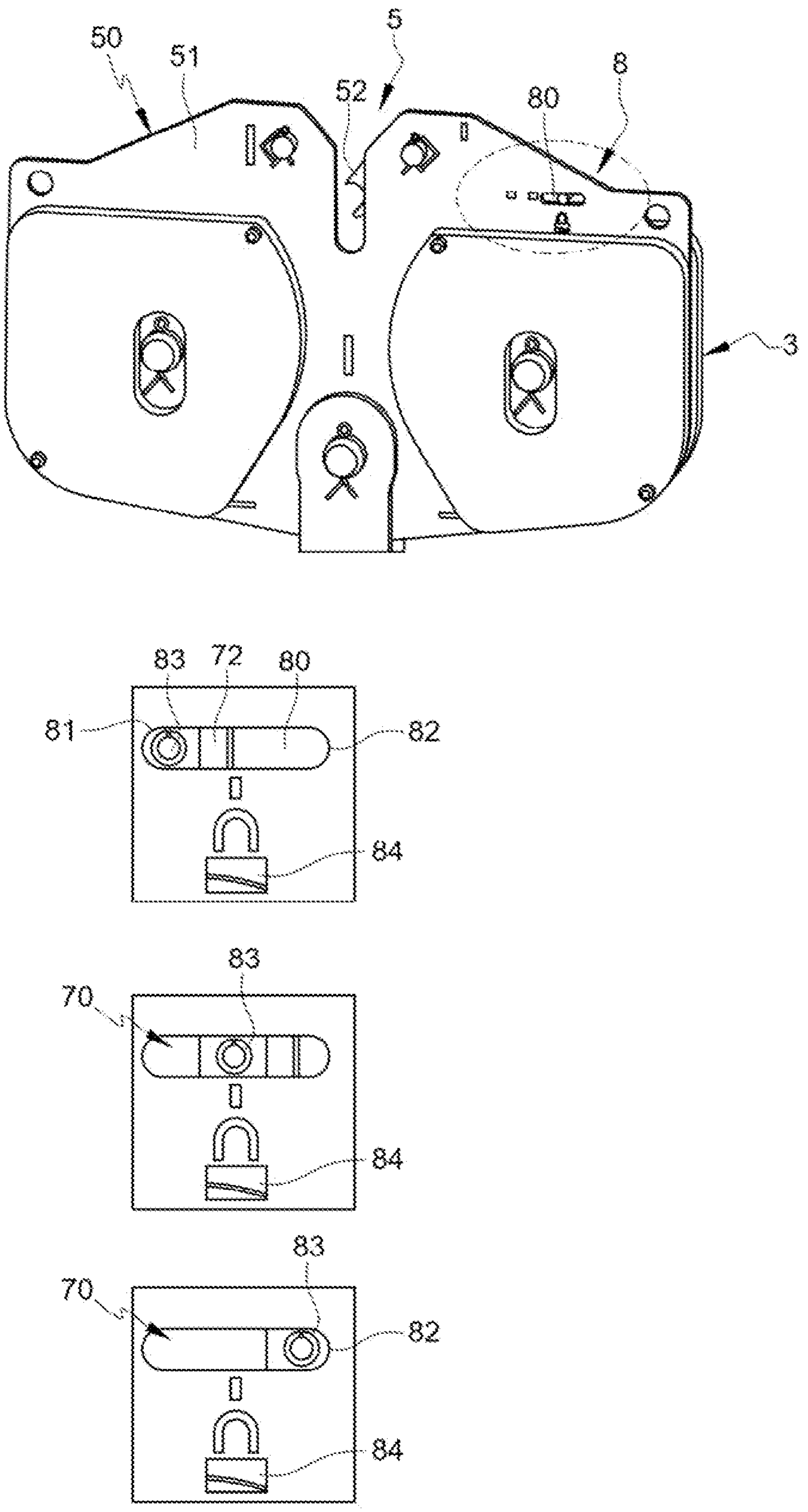
FIG. 18 is a schematic perspective view of the lower reeve block wherein a window is provided in its chassis to form a viewing means used to view the positions of the thrust stop, with three zooms on this window illustrating respectively, top to bottom, the maximum advanced position (associated with the disconnected configuration), the connection retracted position (associated with the connected configuration) and the maximum retracted position (or the maximum retracted position)

Referring to FIG. 18, the double-reeved lifting device 1 also comprises a viewing means 8 configured to view whether the thrust stop 70 is:

- in its maximum advanced position which is associated with the disconnected configuration; or
- in its connection retracted position which is associated with the connected configuration.

This viewing means 8 comprises at least one window 80 formed in the chassis 5, and more precisely in one of the two plates 51, or possibly even two windows 80 which face one another, and which are formed in the two respective plates 51. The or each window 80 is located opposite the thrust stop 70 in order to be able to view a portion of the thrust stop 70 from the outside, and thus see its movement. More specifically, the or each window 80 is located opposite the free rear end 72, and has an oblong or elongated shape parallel to the extension axis of the thrust stop 70. The or each window 80 has two opposite edges, namely a front edge 81 (closer to the pawl 52) and a rear edge 82 (farther from the pawl 52).

The viewing means 8 also comprises:

- a mark 83 provided on the thrust stop 70, and more precisely at its free rear end 72, this mark 83 therefore being movable because it moves with the thrust stop 70; and
- at least one visual reference which is in visual correspondence with the mark 83 when the thrust stop is in its maximum advanced position (associated with the disconnected configuration) or in its connection retracted position (associated with the connected configuration).

In the example of FIG. 18, it is expected to have:

a visual connection reference which is in visual correspondence with the mark 83 when the thrust stop 70 is in its maximum advanced position (associated with the disconnected configuration), where this visual connection reference is in the form of a connection mark 84 on the chassis 50 (and more specifically on one of the two plates 51), this connection mark 84 being located substantially in the middle of the window 80 and is for example in the form of a padlock; and a visual disconnection reference which is in the form of the front edge 81 of the window 80, and which is in visual correspondence with the mark 83 when the thrust stop 70 is in its connection retracted position (associated with the connected configuration), because in this connection retracted position the mark 83 is located at the level of this front edge 81.

Figure 21:
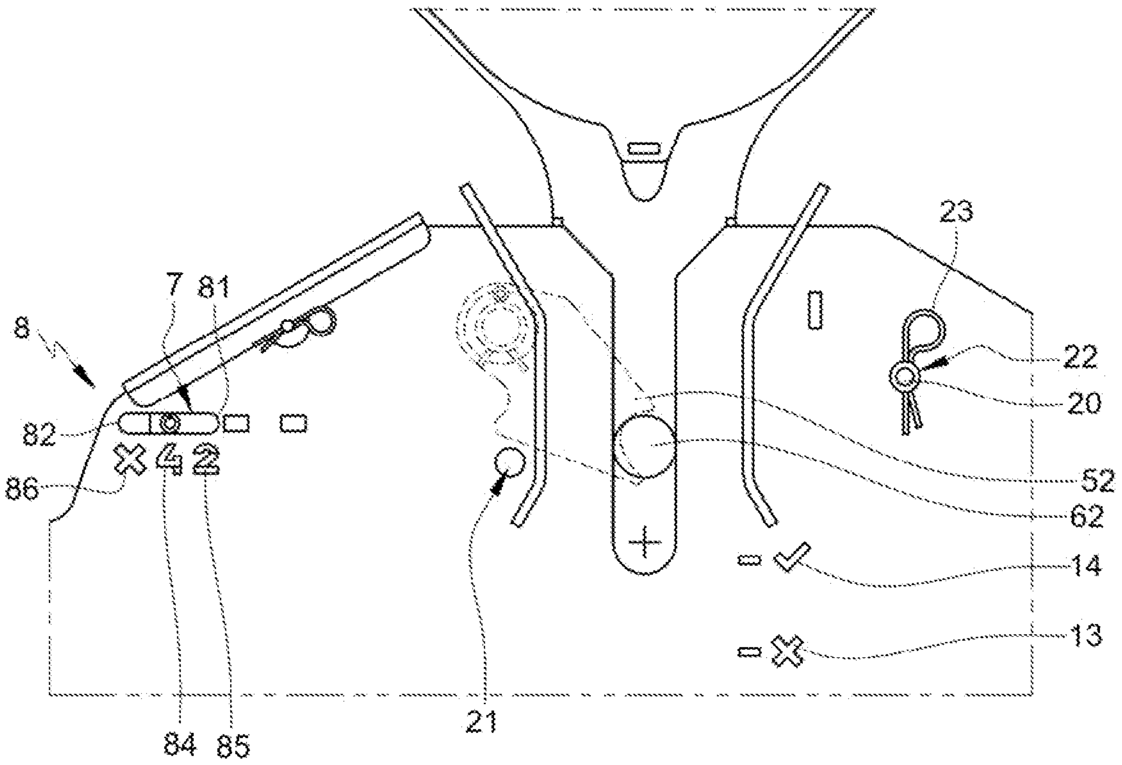
FIG. 21 is a schematic front view of the upper reeve block and the lower reeve block in connected configuration for the double-reeved lifting device of FIG. 19.

In the example of FIG. 21, the visual connection reference is also in the form of the connection mark 84 located substantially in the middle of the window 80, but this time in the form of a number «4» corresponding to the number of lifting strands in the double-reeved configuration (with four strands).

In the example of FIG. 21, the visual disconnection reference is this time in the form of a disconnection mark 85 on the chassis 50 (and more specifically on one of the two plates 51), this disconnection mark 85 being located at the level of the front edge 81 of the window 80, in the form of a number «2» corresponding to the number of lifting strands in the simple-reeved configuration (with two strands).

It is interesting that the viewing means 8 is also configured to view if the thrust stop 70 is in another of the retracted positions, namely the first unstable retracted position, which is associated with a first unstable configuration wherein the pawl 62 is in the first unstable position described above and visible in FIG. 8. This first unstable retracted position of the thrust stop 70 is as a reminder positioned between its said connection retracted position and its maximum retracted position.

In this case, a visual error reference is provided which is in visual correspondence with the mark 83 when the thrust stop 70 is in its first unstable retracted position, which will make it possible to visually indicate to an operator the presence of a defect.

In the example of FIG. 18, the visual error reference corresponds to the rear edge 82 of the window 80, and which is in visual correspondence with the mark 83 when the thrust stop 70 is in its unstable retracted position (associated to the unstable configuration), because in this first unstable retracted position the mark 83 is located at the level of this rear edge 82.

In the example of FIG. 21, the visual error reference is in the form of an error mark 86 located at the level of the rear edge 82, for example in the form of a cross «X».

Figure 20:
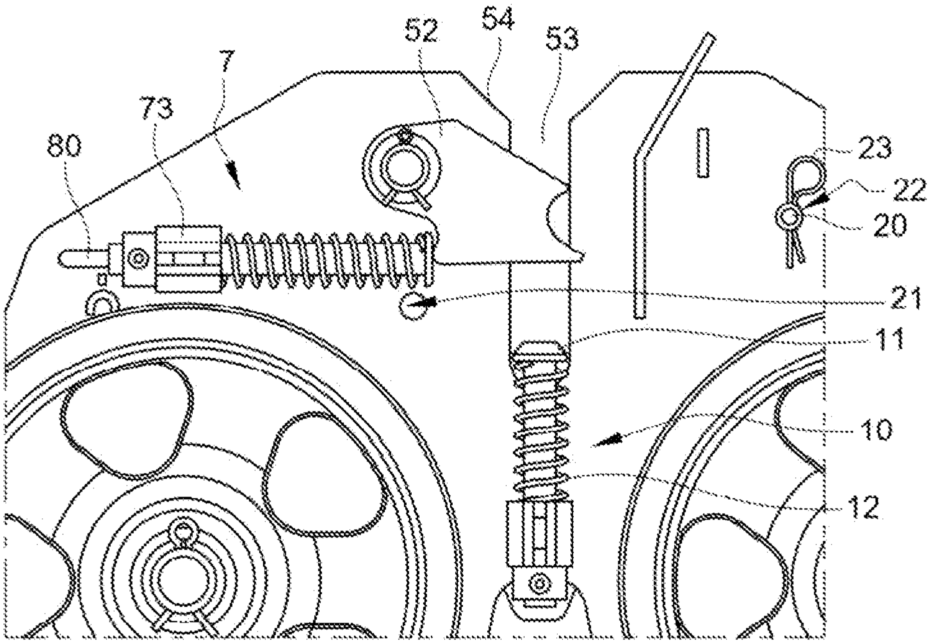
FIG. 20 is a partial schematic front view of the upper reeve block and the lower reeve block in the disconnected configuration for the double-reeved lifting device of FIG. 19.

With reference to FIGS. 20 and 21, it is advantageous to have a removable stop 20 which is in the form of a physical axis or a jib, which can be mounted in two places 21, 22 on the chassis 50, each place being formed by two holes facing one another in the respective plates 51.

The first place 21 is located just below the pawl 52 when the latter is in its locking position (visible in FIG. 21). Thus, when the removable stop 20 is engaged in the first location 21 on the chassis 50, the removable stop 20 is then in a blocking position wherein this removable stop 20 blocks the pawl 52 in pivoting in the distal rotational direction (pivoting downwards) when engaged with the locking member 62 in the connected configuration; the pawl 52 also cannot pivot in the proximal rotational direction (pivoting upwards) because of the locking member 62. Thus, this removable stop 20 makes it possible to lock the connected configuration.

The second location 22 is located at a distance from the pawl 52, for example on the other side vis-à-vis the locking channel 53, so as not to interfere with the pawl 52. Thus, when the removable stop 20 is engaged in the second location 22 on then chassis 50, the removable stop 20 is then in a storage position wherein the removable stop is moved away from pawl 52 so as not to interact with the pawl 52.

This removable stop 20 can also cooperate with a lock 23, such as for example a bolt, a circlip or a retaining pin, in order to prevent it from falling when in the first place 21 or in the second place 22.

Figure 12:
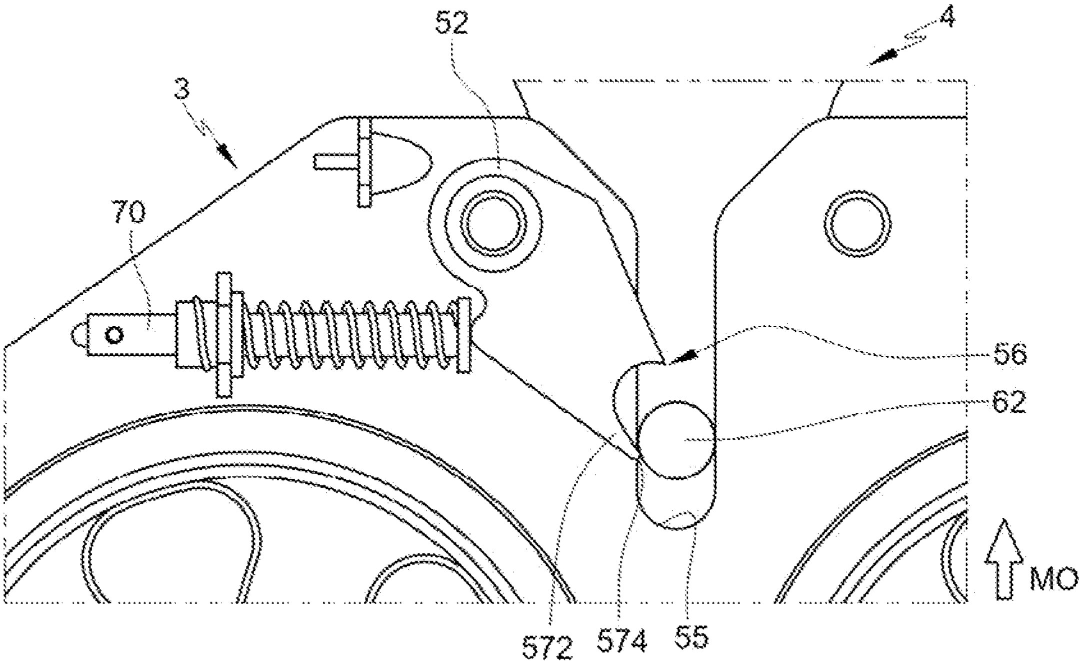
FIG. 12 is a schematic view equivalent to that of FIG. 11, at the start of the first step of the disconnection phase, during which the lower reeve block continues raising until the upper reeve block is at the upper stop and the locking member begins sliding in the entry direction and begins disengaging from the pawl.
Figure 13:
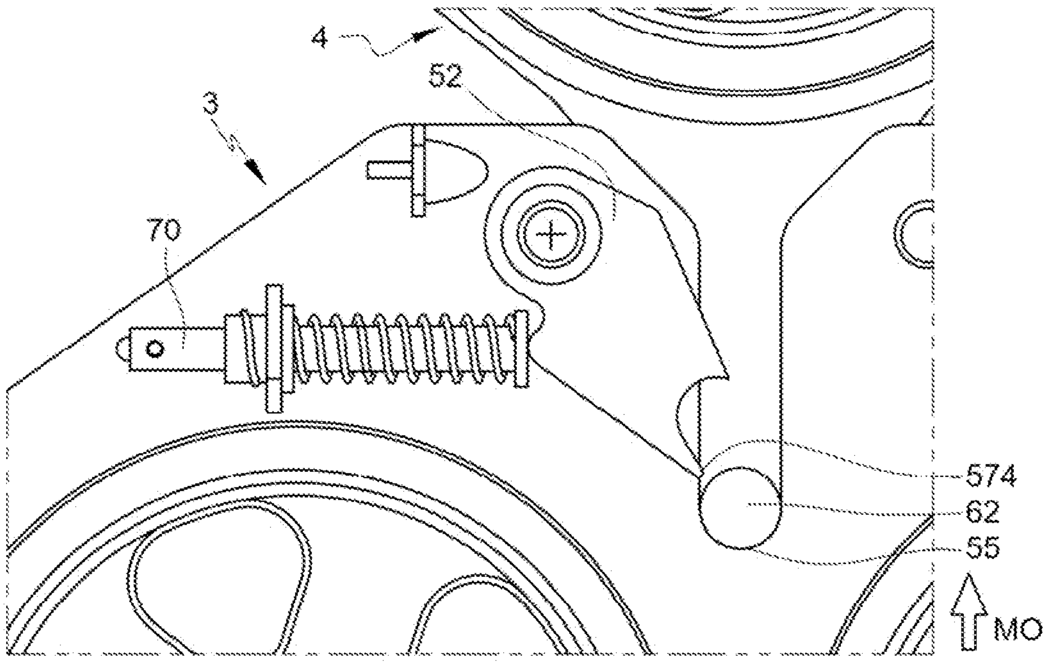
FIG. 13 is a schematic view equivalent to that of FIGS. 11 and 12, almost at the end of the first step of the disconnection phase, where the lower reeve block has finished raising until the locking member is in the bottom of the locking channel.
Figure 14:
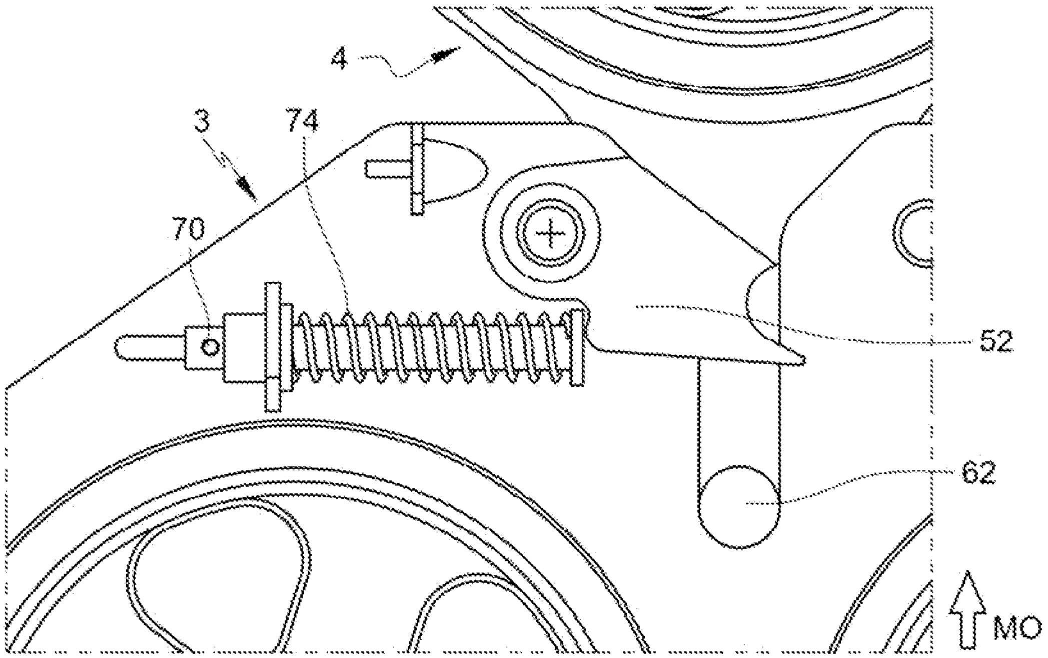
FIG. 14 is a schematic view equivalent to that of FIGS. 11 to 13, at the end of the first step of the disconnection phase, where the lower reeve block has stopped raising and, the locking member having passed the pawl, the pawl has returned to the neutral position, under the effect of a thrust exerted by the thrust stop which returns to its maximum advanced position.

Referring to FIG. 20, it is optionally possible to equip the double-reeved lifting device 1 with a lower thrust device 10 which comprises a lower stop 11 disposed in the bottom 55 of the locking channel 53, and against which the locking member 62 can bears. This lower stop 11 is movably mounted on the chassis 50, between the two plates 51, and it slides in translation along the main axis, between:

a raised position (visible in FIG. 12) in the absence of thrust exerted by the locking member 62 on the lower stop, and some lowered positions in the presence of a thrust force exerted by the locking member on the lower stop 11, with a maximum lowered position wherein the locking member 62 bears against the bottom 55 of the locking channel 53 as seen in FIGS. 13 and 14.

This lower thrust device 10 further comprises a lower elastic return member 12 urging the lower stop 11 towards its raised position and providing a force resisting a thrust force exerted by the locking member 62 on the lower stop 11.

It should be noted that the locking member 62 will come into contact with the lower stop 11 only during the disconnection phase, during the steps of FIGS. 12 to 14, and this lower stop 11 is advantageous for reducing the influence of the dynamics of the lifting rope slack, and making the movements of the lower reeve block 3 more reliable during this disconnection phase.

In association with this lower thrust device 10, there can be provided a lower viewing means configured to view whether the lower stop 11 is in its raised position which is associated with the connected configuration or in one of its lowered positions called unstable lowered position, which is associated with a second unstable configuration wherein the pawl 62 is in the second unstable position described above, wherein as a reminder the locking member 62 is stuck under the pawl 52 bearing on the distal tip 574.

In the example of FIG. 21, the lower viewing means comprises:

a mark (not illustrated) provided on the lower stop 11, this mark therefore being movable because it moves with the lower stop 11; and a visual instability reference 12 which is in visual correspondence with the mark when the lower stop 11 is in its unstable lowered position.

In the example of FIG. 21, this visual instability reference 13 is in the form of a low orifice associated with a symbol in the form of a cross «X», the mark being placed in front of this orifice when the lower stop 11 is in its unstable lowered position.

There can also be provided a visual rest reference 14, which is in the form of a top orifice (above the bottom orifice) associated with a symbol in the shape of a «V», the mark being placed in front of this top orifice when the lower stop 11 is in its raised position.

The remainder of the description covers a connection phase for the switch from the disconnected configuration to the connected configuration, with reference to FIGS. 5 to 10.

Figure 5:
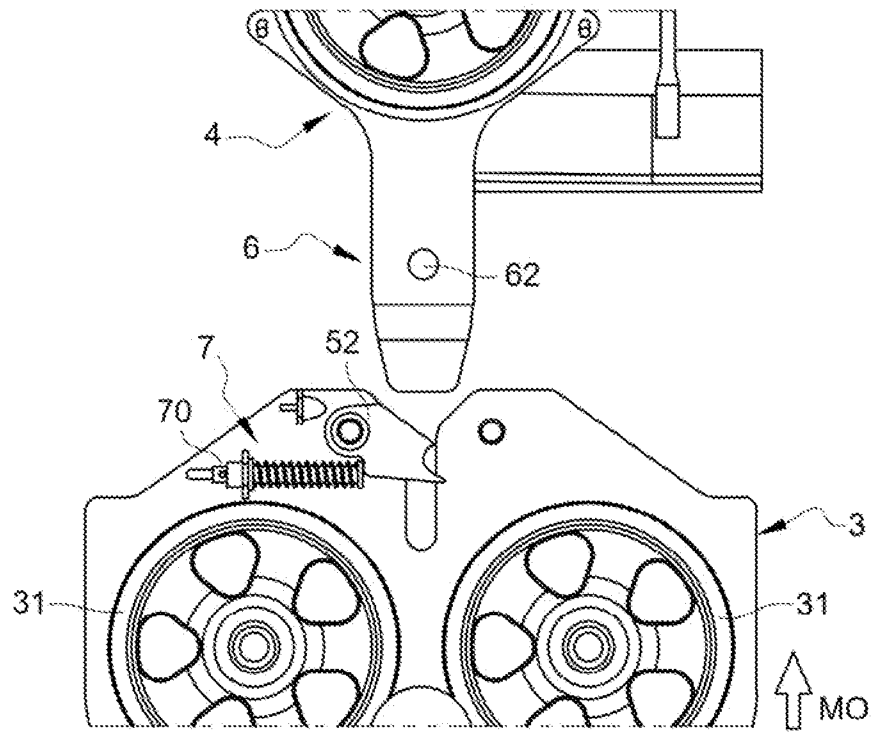
FIG. 5 is a schematic view equivalent to those of FIGS. 2 and 4, with the upper reeve block and the lower reeve block in the disconnected configuration, at the start of a first step of a connection phase during which the lower reeve block start raising, the thrust stop then being in its maximum advanced position.
Figure 6:
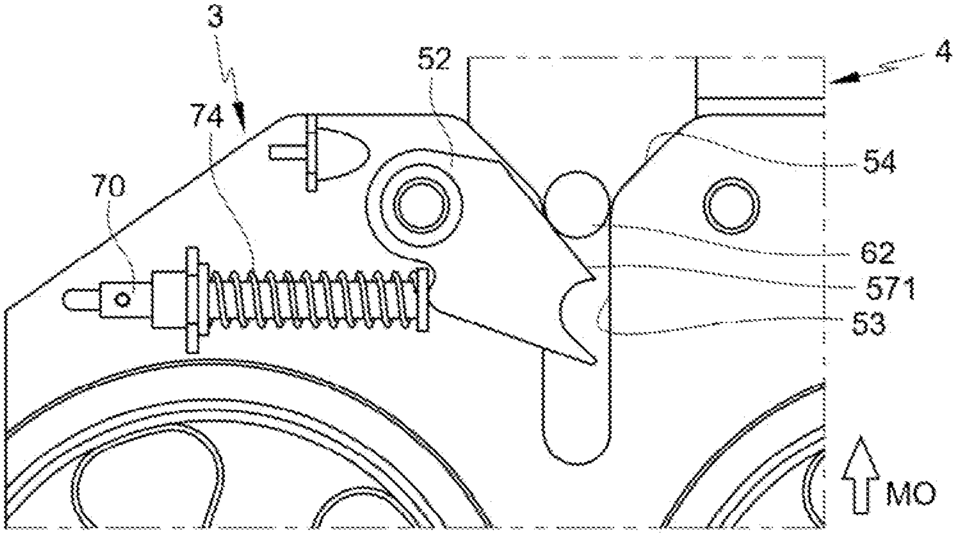
FIG. 6 is a schematic view equivalent to those of FIG. 5, during the first step of the connection phase, where the lower reeve block continues raising until the locking member starts sliding in the entry direction and comes into contact with the pawl.

Referring to FIG. 5, in the disconnected configuration, the upper reeve block 4 hangs above the lower reeve block 3 and the pawl 52 is in the neutral position, with the thrust stop 70 in the maximum advanced position. To switch from the disconnected configuration into the connected configuration, the lower reeve block 3 begins by being raised, as schematized by the arrow MO, for a relative approach between the two reeve blocks 3, 4, until the locking member 62 comes into the locking channel 53, with reference to FIG. 6, through the mouthpiece 54 and comes into contact with the proximal rim 571 of the pawl 52, thus bringing the upper reeve block 4 reaches the high stop on the jib, and more specifically until the upper stop 43 of the upper reeve block 4 abuts against the distribution trolley 9.

Figure 7:
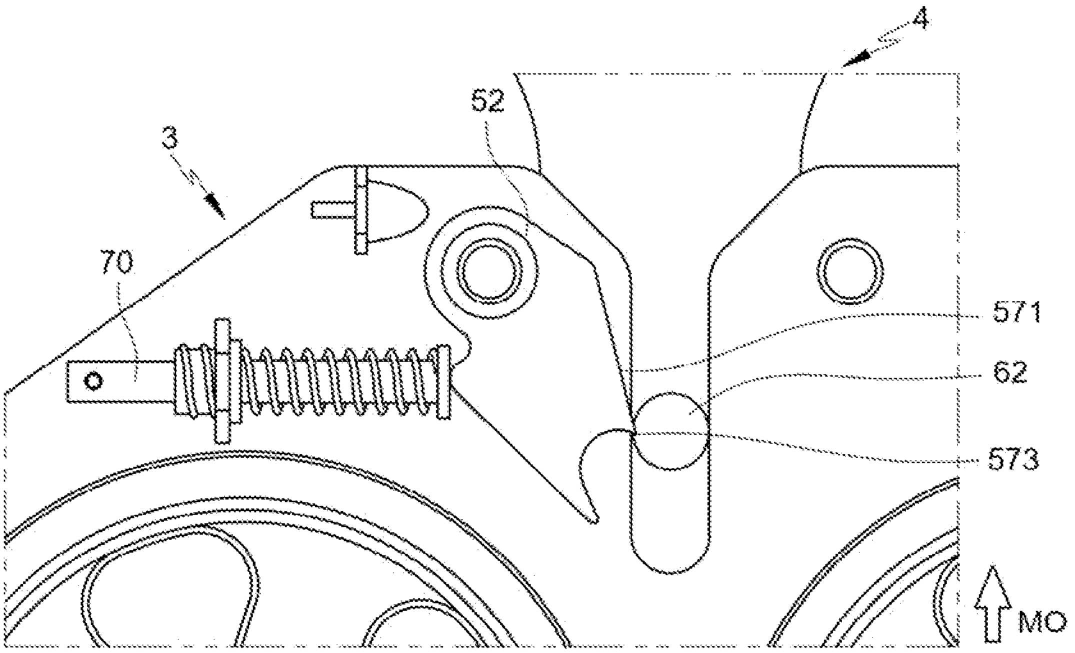
FIG. 7 is a schematic view equivalent to those of FIGS. 5 and 6, during the first step of the connection phase, where the lower reeve block continues raising and the locking member pushes the pawl towards its distal position until clearing the passage for the locking member, the thrust stop moving back until it reaches its maximum retracted position.
Figure 8:
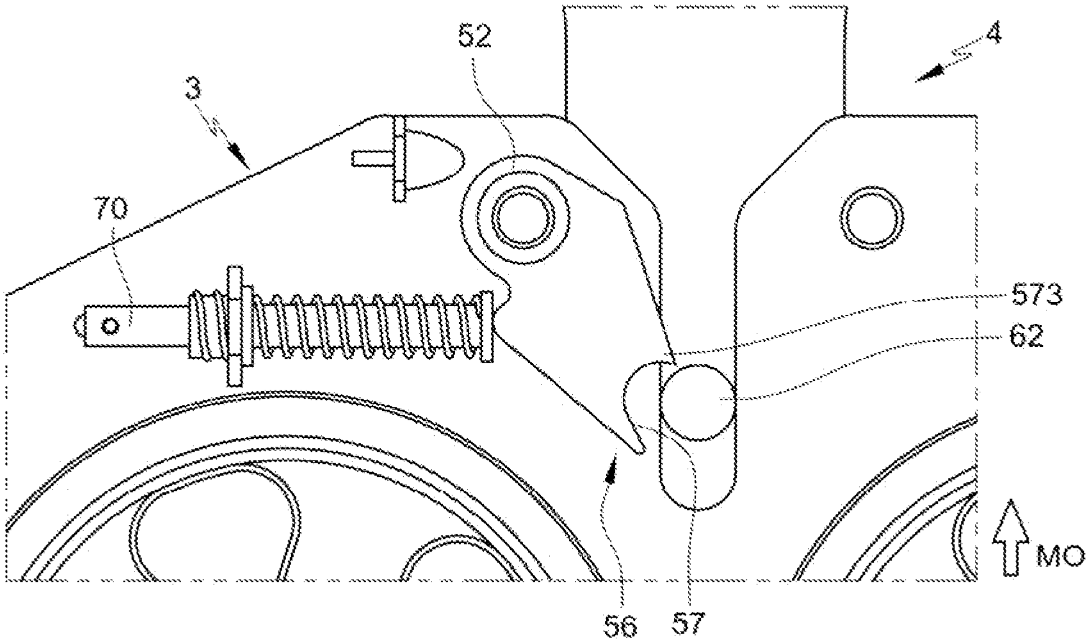
FIG. 8 is a schematic view equivalent to those of FIGS. 5 to 7, during the first step of the connection phase, where the locking member has barely passed the pawl which remains in contact with the locking member, the pawl then being in an unstable intermediate position, the thrust stop being in an unstable retracted position.
Figure 9:
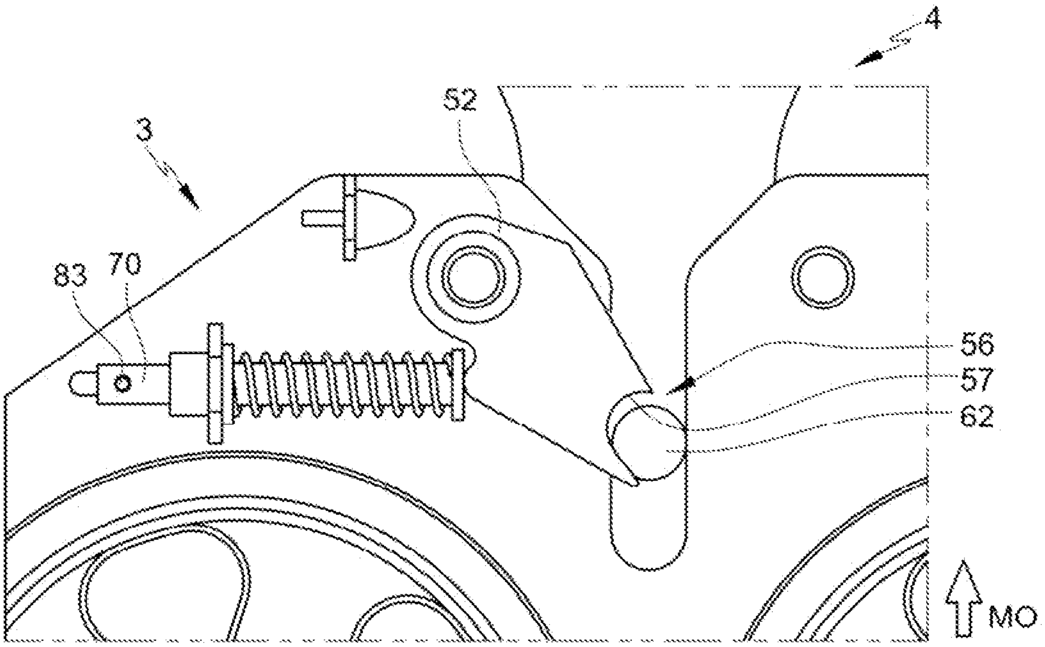
FIG. 9 is a schematic view equivalent to those of FIGS. 5 to 8, at the end of the first step of the connection phase, where the lower reeve block has finished raising so that the locking member has engaged inside the free end of the pawl.

Referring to FIGS. 7 to 9, while carrying on the raising of the lower reeve block 3, the locking member 62 exerts a thrust on the proximal rim 571 of the pawl 52, while sliding inside the locking channel 53 according to the entry direction (downwards), so as to bring the pawl 52 into the distal position wherein the locking member 62 bears against the proximal tip 573 (see FIG. 7), then the locking member 62 passes the tip 573 of the pawl 52 (see FIG. 8), and then the pawl 52 leaves contact with the proximal tip 573 (see FIG. 9) and pivots in the proximal rotational direction (upwards) under the effect of a thrust exerted by the thrust device 7, until the distal rim 572 of the pawl 52 in turn comes into contact with the locking member 62, as schematized in FIG. 9. Thus, and as shown in FIG. 9, the locking member 62 is engaged inside the free end 56 of the pawl 52.

It should be noted that, if this sequence is stopped while the locking member 62 is stuck in the locking channel 53 bearing on the proximal tip 573 (which corresponds to the first unstable configuration wherein the pawl 62 is in the first unstable position described above and visible in FIG. 8), then the thrust stop 70 is in the first unstable retracted position and the mark 83 is in correspondence with the visual error reference.

Figure 10:
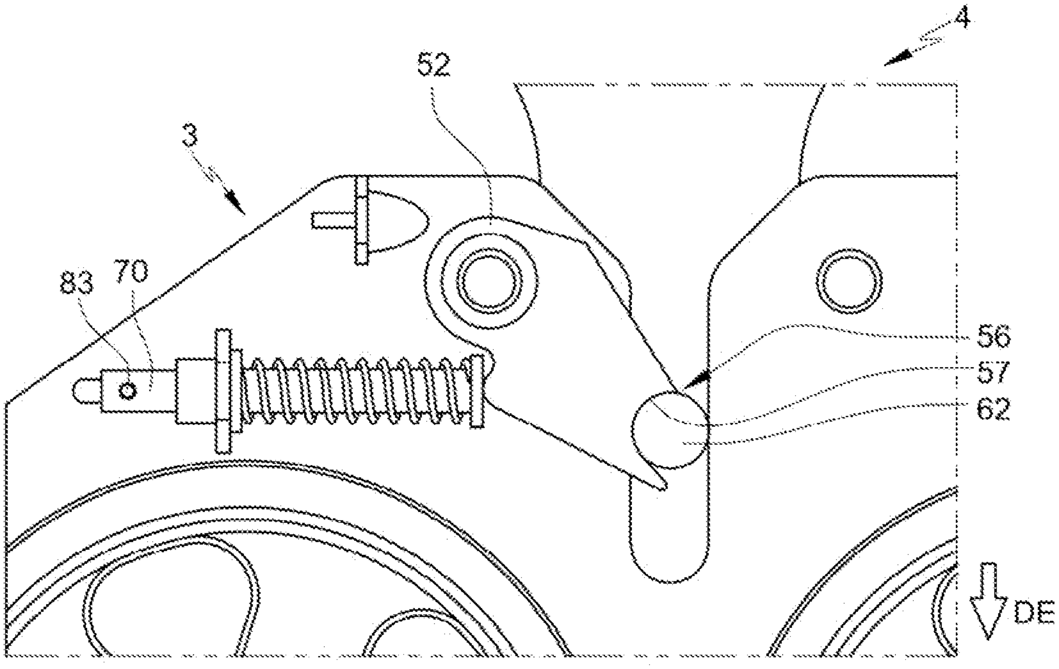
FIG. 10 is a schematic view equivalent to those of FIGS. 5 to 9, during a second step of the connection phase, during which the lower reeve block is descended so that the locking member has brought the pawl into locking position, and thus the locking member is stuck inside the free end of the pawl, so that the lower reeve block could descend with the upper reeve block in the connected configuration, the thrust stop then being in its connection retracted position.

Referring to FIG. 10, the lower reeve block 3 is then moved in descent, as schematized by the arrow DE, so that the locking member 62 slides inside the locking channel 53 in the exit direction (upwards), and brings the pawl 52 into the locking position, until the locking member 62 is stuck inside the free end 56 of the pawl 52 and is therefore slidably blocked in the locking channel 53 according to the exit direction, and thus the lower reeve block 3 and the upper reeve block 4 are connected. The thrust stop 70 is in the connection retracted position, and the mark 83 is in correspondence with the visual connection reference 84, which allows the operator to view the connection and thus continue the descent of the lower reeve block 3 with the upper reeve block 4 in the connected configuration. It is also possible, if this option is present, to use the removable stop 20 to lock the connected configuration.

The following description covers a disconnection phase for the switch from the connected configuration to the disconnected configuration, with reference to FIGS. 11 to 17.

Figure 11:
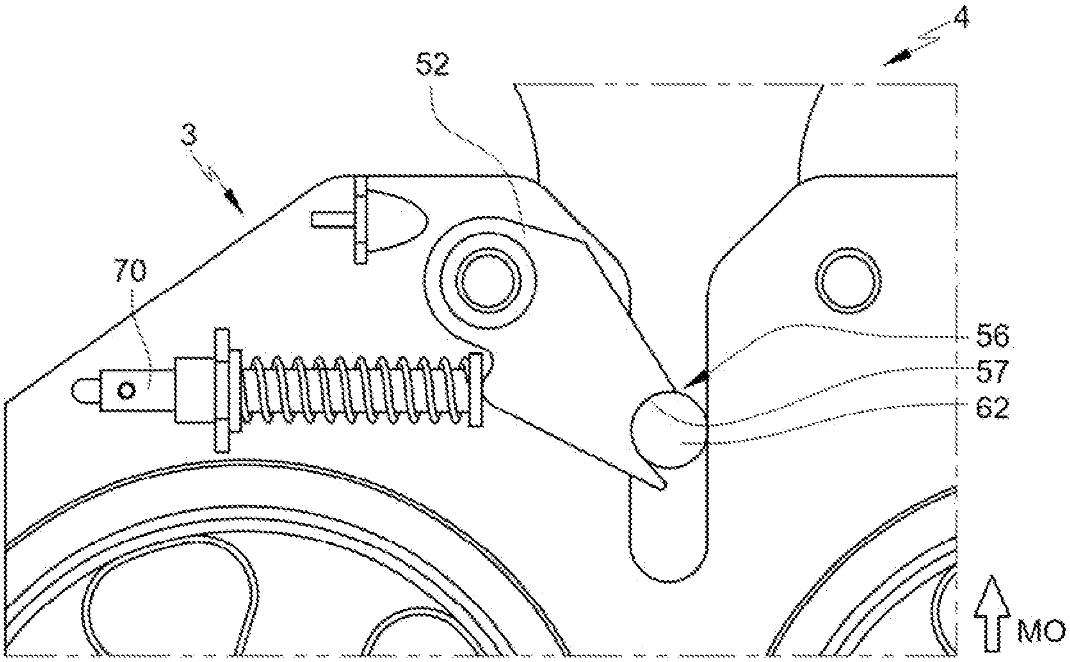
FIG. 11 is a schematic view equivalent to that of FIGS. 2 and 4, at the start of a first step of a disconnection phase, the upper reeve block and the lower reeve block being in the connected configuration, with the locking member engaged with the pawl, and the lower reeve block starts raising.

Referring to FIG. 11, in the connected configuration, the pawl 52 is in the locking position and the locking member 62 is stuck inside the free end 56 of the pawl 52, more precisely with the locking member 62 stuck inside the indentation 57 of this free end 56. The thrust stop 70 is then in its connection retracted position, and the mark 83 is in correspondence with the visual connection reference 84.

In this connected configuration, the lower reeve block 3 can be descended together with the upper reeve block 4. Indeed, when the lower reeve block 3 descends with its pawl 52, this pawl 52 is blocked by the locking member 62 and cannot pivot towards the proximal position according to the proximal rotational direction (pivoting upwards). Thus, the pawl 52 remains blocked in the locking position with the locking member 62 which, as a reminder, is secured to the upper reeve block 4. The upper reeve block 4 is therefore connected to the lower reeve block 3 and therefore descends with it.

Referring to FIGS. 11 and 12, to switch from the connected configuration to the disconnected configuration, the lower reeve block 3 is first raised (with the upper reeve block 4), as schematized by the arrow MO, until the upper reeve block 4 reaches the high stop on the jib, and more specifically until the upper stop 43 of the upper reeve block 4 abuts against the distribution trolley 9.

Referring to FIGS. 12 and 13, once the upper reeve block 4 in the upper stop, the lower reeve block 3 continues raising, as schematized by the arrow MO, while the upper reeve block 4 is blocked. Thus, as the locking channel 53 raises, the locking member 62 slides inside this locking channel 53 according to the entry direction (downwards), it being noted that the pawl 52 will not resist this sliding and that the pawl 52 will thus pivot in the distal rotational direction (downwards) under the effect of a thrust exerted by the locking member 62 on the distal rim 572 of the pawl 52. Also, the pawl 52 pivots downwards, whereas the locking member 62 slides in the direction of the bottom 55, until the locking member 62 leaves the inside of the free end 56 of the pawl 52, passes the tip distal 574 and ends up leaving contact with the pawl 52, and then, as illustrated in FIG. 14, the pawl 52 returns back to the neutral position under the effect of the thrust exerted by the thrust device 7, and the locking member 62 is under the pawl 52 (or is even disposed in the bottom 55 of the locking channel 53). During this step, the thrust stop 70 moves back under the effect of the pivoting of the pawl 52 until it reaches the intermediate distal position when the locking member 62 is bearing on the distal tip 574, then the thrust stop 70 advances to return the pawl 52 to the neutral position.

It should be noted that, between the intermediate distal position of FIG. 12 and the position of FIG. 13, the locking member 62 can remain stuck in the locking channel 53 bearing on the distal tip 574, which corresponds to the second unstable configuration wherein the pawl 62 is in the second unstable position described above. In this case, the use of the lower thrust device 10 and the lower viewing means previously described are practical to allow an operator to view this sticking in order to remedy it.

Figure 15:
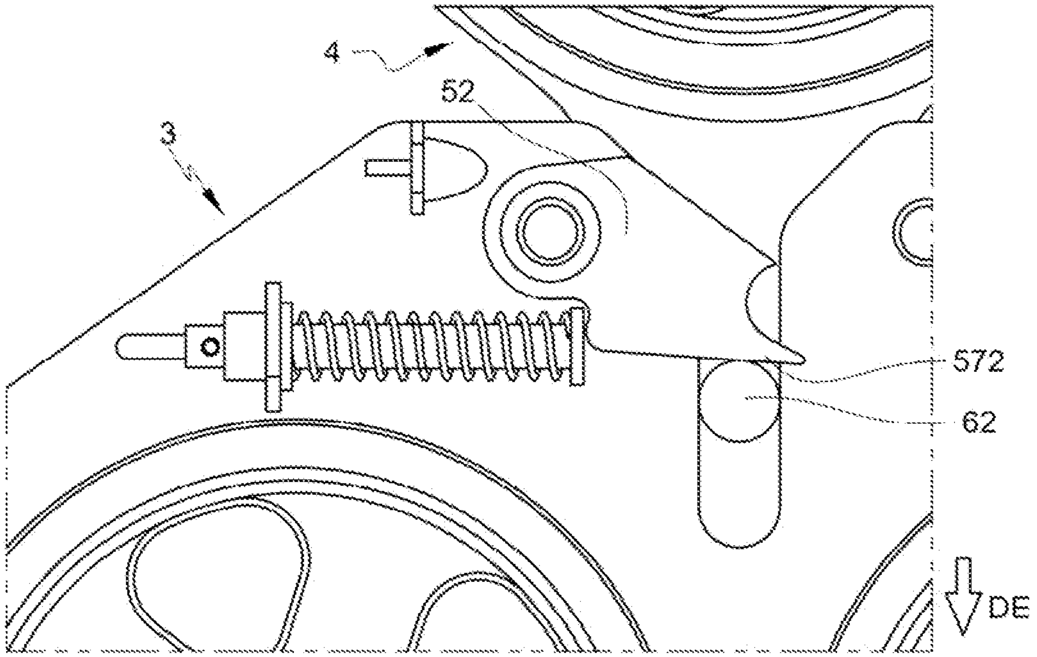
FIG. 15 is a schematic view equivalent to those of FIGS. 11 to 14, at the start of a second step of the disconnection phase, during which the lower reeve block begins to descend so that the locking member begins sliding in the exit direction and comes into contact with the pawl to push it towards its proximal position.
Figure 16:
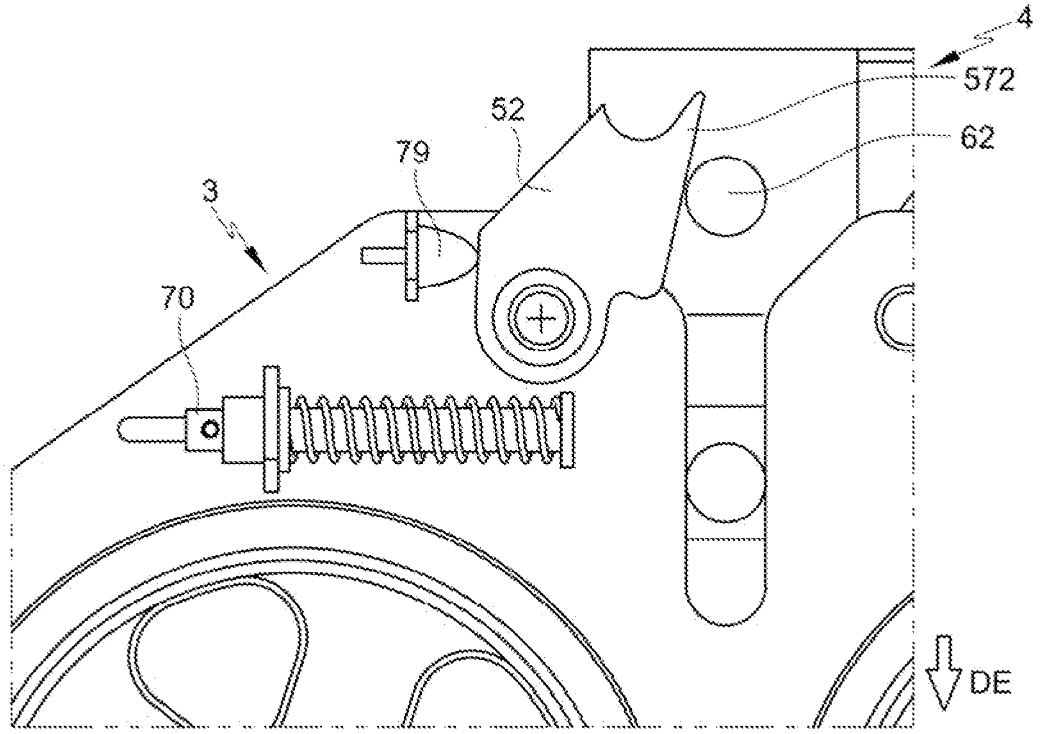
FIG. 16 is a schematic view equivalent to those of FIGS. 11 to 15, almost at the end of the second step of the disconnection phase, during which the lower reeve block continues to descend so that the locking member has brought the pawl into its proximal position and that the locking member is ready to completely escape from the lower reeve block and the pawl.

Referring to FIG. 15, the lower reeve block 3 is moved downwards, as schematized by the arrow DE, so that the locking member 62 slides inside the locking channel 53 in the exit direction (upwards), until it bears against the distal rim 572 of the pawl 52, thus pushing the pawl 52 which then pivots in the direction of proximal rotation (upwards) until it reaches the proximal position, as illustrated in FIG. 16, thus allowing the locking member 62 to exit the locking channel 53 and disengage from pawls 52. During this step, the thrust stop 70 remains at all times in its maximum advanced position, the pawl 52 leaving contact with its free front end 71 pivoting to the proximal position. Moreover, in the proximal position, the pawl 52 bears against the proximal stop 79, which it slightly crushes under the stress exerted by the locking member 62.

Figure 17:
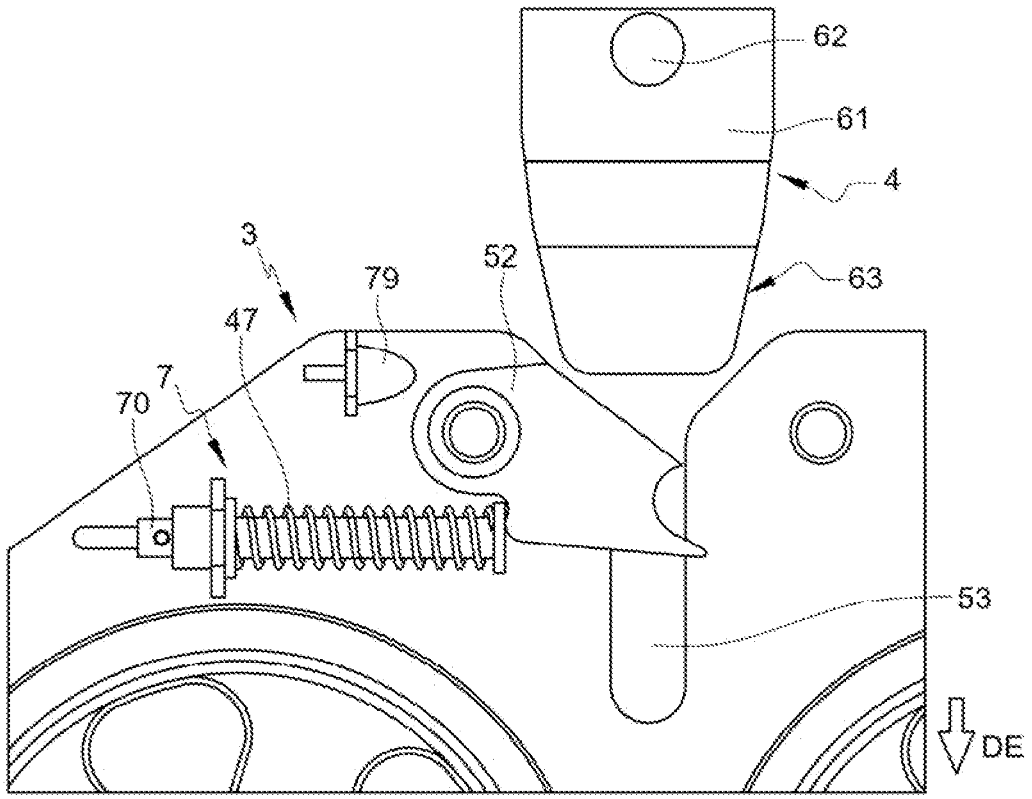
FIG. 17 is a schematic view equivalent to those of FIGS. 11 to 16, at the end of the second step of the disconnection phase, during which the lower reeve block continues to descend so that the locking member is completely disengaged from the lower reeve block and the pawl has returned to the neutral position, finalizing the disconnection between the reeve blocks.

Thus, and as illustrated in FIG. 17, the locking member 62 is completely disengaged from the locking mechanism 5 and the pawl 52 has returned to the neutral position under the effect of the proximal stop 79 and its own weight, and thus the lower reeve block 3 and upper reeve block 4 are disconnected. The thrust stop 70 is in the disconnection retracted position, and the mark 83 is in correspondence with the visual disconnection reference 81 or 85, which allows the operator to view the disconnection and thus continue the descent of the lower reeve block 3 alone in the disconnected configuration, without the upper reeve block 4 which remains at the level of the distribution trolley 9.

It should thus be noted that, in the connection phase and in the disconnection phase, only the control of the ascending/descending movements of the lower reeve block 3 makes it possible to switch from a connected configuration to the disconnected configuration, and vice versa. The ascending/descending movements of the lower reeve block 3 are controlled by controlling the lifting winch.

Also, it is advantageous to automate the movements of the lower reeve block 3, in the connection phase and in the disconnection phase, by means of a control/command unit which controls the lifting winch. In this context of automation of the connection and disconnection phases, it is advantageous to provide one or more sensors making it possible to detect relative positions between the lower reeve block 3 and the upper reeve block 4, such as for example a sensor making it possible to detect when the upper reeve block 4 is in upper stop on the jib, and more specifically when the upper stop 43 of the upper reeve block 4 bears against the distribution trolley 9. Indeed, this position constitutes a starting point for the movements which will follow in the connection and disconnection phases.

Moreover, it is possible to reverse the positions of the locking mechanism and of the complementary locking structure 6 of the reversible connection means, by providing the locking mechanism 5 on the upper reeve block 4 and by providing the complementary locking structure 6 on the lower reeve block 3. It is also possible to operate with a single pawl 52 for the locking mechanism 5, by adapting the shape of the pawl 52 to wedge the locking member 62 in the locking channel 53. Alternatively, it is possible to operate with more than two pawls 52 for the locking mechanism 5. It is also possible to provide elastic constraint elements 59 other than springs, such as for example elastic blades, return mechanisms, or other equivalent means.

The invention claimed is:

1. A double-reeved lifting device for a lifting machinery, the double-reeved lifting device comprising two reeve blocks including a lower reeve block secured to a lifting hook and an upper reeve block, wherein the two reeve blocks comprise a mechanical reversible connection system to be reversibly configurable between:

a connected configuration wherein the upper reeve block is connected to the lower reeve block to be able to accompany the lower reeve block in ascending/descending movements along a main axis; and a disconnected configuration wherein the upper reeve block is disconnected from the lower reeve block to be able to remain hanging above the lower reeve block such that the lower reeve block is configured to perform ascending/descending movements without the upper reeve block, wherein the mechanical reversible connection system comprises a locking mechanism mounted on one of the two reeve blocks, and a complementary locking structure mounted on the other of the two reeve blocks and comprising a locking member capable of cooperating with the locking mechanism, and wherein the locking mechanism comprises:

a chassis having a locking channel of elongated shape along the main axis and provided with a mouthpiece through which the locking member is configured to enter and exit the locking channel and slide in the locking channel in an entry direction and in an exit direction, opposite to the entry direction, respectively upon a relative approach or a relative distancing between the two reeve blocks; and at least one pawl pivotally mounted on the chassis around a pivot axis so as to pivot inside the locking channel, the pawl being provided with a free end adapted to engage with the locking member, the locking mechanism further comprising:

a thrust stop provided with a free front end adapted to abut against the pawl, the thrust stop being movably mounted on the chassis between a maximum advanced position in the absence of a thrust exerted by the pawl on the free front end, and retracted positions in the presence of a thrust force exerted by the pawl on the free front end; and an elastic return member urging the thrust stop towards the maximum advanced position and providing a force resisting the thrust force exerted by the pawl on the free front end.

2. The double-reeved lifting device according to claim 1, wherein the thrust stop is slidably mounted in translation on the chassis.

3. The double-reeved lifting device according to claim 1, further comprising viewing means configured to view whether the thrust stop is in the maximum advanced position which is associated with the disconnected configuration or in a connection retracted position of the retracted positions, wherein the connection retracted position is associated with the connected configuration.

4. The double-reeved lifting device according to claim 3, wherein the viewing means is configured to view whether the thrust stop is in an unstable retracted position of the retracted positions, wherein the unstable retracted position is associated with an unstable configuration in which the thrust stop has moved back beyond the connection retracted position.

5. The double-reeved lifting device according to claim 4, wherein the viewing means comprises a window made in the chassis to view a mark provided on the thrust stop when in the maximum advanced position or in the connection retracted position, wherein the viewing means comprises, on the chassis, at least one visual reference which is in visual correspondence with the mark of the thrust stop when the thrust stop is in the maximum advanced position or in the connection retracted position, wherein the at least one visual reference comprises a visual connection reference which is in visual correspondence with the mark of the thrust stop when the thrust stop is in the maximum advanced position, and a visual disconnection reference which is in visual correspondence with the mark of the thrust stop when the thrust stop is in the connection retracted position, and wherein the at least one visual reference comprises a visual error reference which is in visual correspondence with the mark of the thrust stop when the thrust stop is in the unstable retracted position.

6. The double-reeved lifting device according to claim 3, wherein the viewing means comprises a window made in the chassis to view a mark provided on the thrust stop when in the maximum advanced position or in the connection retracted position.

7. The double-reeved lifting device according to claim 6, wherein the viewing means comprises, on the chassis, at least one visual reference which is in visual correspondence with the mark of the thrust stop when the thrust stop is in the maximum advanced position or in the connection retracted position.

8. The double-reeved lifting device according to claim 7, wherein the at least one visual reference comprises a visual connection reference which is in visual correspondence with the mark of the thrust stop when the thrust stop is in the maximum advanced position, and a visual disconnection reference which is in visual correspondence with the mark of the thrust stop when the thrust stop is in the connection retracted position.

9. The double-reeved lifting device according to claim 6, wherein the thrust stop has a free rear end, opposite the free front end, and the mark is provided on the free rear end which faces the window.

10. The double-reeved lifting device according to claim 9, wherein the thrust stop passes through a fixed support secured to the chassis so that the free front end and the free rear end are disposed on either side of the fixed support.

11. The double-reeved lifting device according to claim 10, wherein the elastic return member is interposed between the fixed support and the free front end.

12. The double-reeved lifting device according to claim 3, wherein the viewing means comprises at least one position sensor configured to detect the thrust stop at least in the maximum advanced position and in the connection retracted position, and a displayer connected to the at least one position sensor for displaying the position of the thrust stop according to a detection by the at least one position sensor.

13. The double-reeved lifting device according to claim 12, wherein the at least one position sensor is a contact sensor or a contactless sensor including an inductive sensor, a resistive sensor or a light sensor.

14. The double-reeved lifting device according to claim 1, wherein the pawl is pivotably movable between:

a neutral position wherein the thrust stop is in the maximum advanced position with the free front end in contact with the pawl at rest;

a distal position, wherein the pawl clears the passage for the locking member under the effect of a thrust exerted by the locking member sliding in the entry direction, the distal position being associated with a pivoting of the pawl in a distal rotational direction from the neutral position, the pawl thus exerting a thrust force on the free front end of the thrust stop which is pushed to a maximum retracted position of the retracted positions;

a proximal position, wherein the pawl clears the passage for the locking member under the effect of a thrust exerted by the locking member sliding in the exit direction, the proximal position being associated with a pivoting of the pawl in a proximal rotational direction, opposite to the distal rotational direction, from the neutral position, the pawl no longer being in contact with the free front end of the thrust stop which is then in the maximum advanced position; and a locking position, intermediate between the neutral position and the distal position, wherein the free end of the pawl blocks the locking member sliding in the locking channel according to the exit direction, with the locking member stuck inside the free end, the pawl thus exerting a thrust force on the free front end of the thrust stop which is blocked in a connection retracted position of the retracted positions, located between the maximum retracted position and the maximum advanced position.

15. The double-reeved lifting device according to claim 1, wherein the at least one pawl comprises a single pawl.

16. The double-reeved lifting device according to claim 1, further comprising a removable stop which is movable on the chassis into a locking position wherein the removable stop blocks the pawl pivoting when the pawl is engaged with the locking member in the connected configuration.

17. The double-reeved lifting device according to claim 16, wherein the removable stop is also movable on the chassis in a storage position wherein the removable stop is moved away from the pawl so as not to interact with the pawl.

18. The double-reeved lifting device according to claim 1, further comprising:

a lower stop disposed in a bottom of the locking channel, opposite the mouthpiece, and against which the locking member is configured to bear, the lower stop being movably mounted on the chassis between a raised position in the absence of thrust exerted by the locking on the lower stop, and lowered positions in the presence of a thrust force exerted by the locking member on the lower stop; and a lower elastic return member urging the lower stop towards the raised position and providing a force resisting a thrust force exerted by the locking member on the lower stop.

19. The double-reeved lifting device according to claim 18, wherein the lower stop is slidably mounted in translation on the chassis along the main axis.

20. The double-reeved lifting device according to claim 18, comprising lower viewing means configured to view whether the lower stop is in the raised position which is associated with the connected configuration or in an unstable lowered position of the lowered positions, wherein the unstable lowered position is associated with an unstable configuration in which the locking member is stuck under the pawl.

21. A lifting machinery comprising:

a jib; and a double-reeved lifting device configured to lift/lower a load along the jib, the double-reeved lifting device comprising two reeve blocks including a lower reeve block secured to a lifting hook and an upper reeve block, wherein the two reeve blocks comprise a mechanical reversible connection system to be reversibly configurable between:

a connected configuration wherein the upper reeve block is connected to the lower reeve block to be able to accompany the lower reeve block in ascending/descending movements along a main axis; and a disconnected configuration wherein the upper reeve block is disconnected from the lower reeve block to be able to remain hanging above the lower reeve block such that the lower reeve block is configured to perform ascending/descending movements without the upper reeve block, wherein the mechanical reversible connection system comprises a locking mechanism mounted on one of the two reeve blocks, and a complementary locking structure mounted on the other of the two reeve blocks and comprising a locking member capable of cooperating with the locking mechanism, and wherein the locking mechanism comprises:

a chassis having a locking channel of elongated shape along the main axis and provided with a mouthpiece through which the locking member is configured to enter and exit the locking channel and slide in the locking channel in an entry direction and in an exit direction, opposite to the entry direction, respectively upon a relative approach or a relative distancing between the two reeve blocks; and at least one pawl pivotally mounted on the chassis around a pivot axis so as to pivot inside the locking channel, the pawl being provided with a free end adapted to engage with the locking member, the locking mechanism further comprising:

a thrust stop provided with a free front end adapted to abut against the pawl, the thrust stop being movably mounted on the chassis between a maximum advanced position in the absence of a thrust exerted by the pawl on the free front end, and retracted positions in the presence of a thrust force exerted by the pawl on the free front end; and an elastic return member urging the thrust stop towards the maximum advanced position and providing a force resisting the thrust force exerted by the pawl on the free front end, wherein the lower reeve block is hanging on the jib by a lifting rope connected to a lifting winch for raising/lowering the lower reeve block, the lifting rope passing through the upper reeve block.

* * * * *